US009961144B2

(12) United States Patent
Fein et al.

(10) Patent No.: US 9,961,144 B2
(45) Date of Patent: *May 1, 2018

(54) DATA STORAGE AND RETRIEVAL

(71) Applicant: Callahan Cellular L.L.C., Wilmington, DE (US)

(72) Inventors: Gene Fein, Malibu, CA (US); Edward Merritt, Lenox, MA (US)

(73) Assignee: CALLAHAN CELLULAR L.L.C., Wilmington, DE (US)

( * ) Notice: Subject to any disclaimer, the term of this patent is extended or adjusted under 35 U.S.C. 154(b) by 331 days.

This patent is subject to a terminal disclaimer.

(21) Appl. No.: 14/951,157

(22) Filed: Nov. 24, 2015

(65) Prior Publication Data

US 2016/0150017 A1    May 26, 2016

Related U.S. Application Data

(63) Continuation of application No. 13/735,759, filed on Jan. 7, 2013, now Pat. No. 9,203,928, which is a continuation-in-part of application No. 13/003,502, filed as application No. PCT/US2009/049763 on Jul. 7, 2009, now Pat. No. 8,370,446, which is a
(Continued)

(51) Int. Cl.
*G06F 15/167* (2006.01)
*H04L 29/08* (2006.01)
*G06Q 30/02* (2012.01)
*H04L 29/06* (2006.01)

(52) U.S. Cl.
CPC ..... *H04L 67/1097* (2013.01); *G06Q 30/0269* (2013.01); *G06Q 30/0271* (2013.01); *H04L 63/0471* (2013.01); *H04L 67/02* (2013.01); *H04L 67/20* (2013.01); *H04L 67/327* (2013.01)

(58) Field of Classification Search
CPC ........ H04L 67/20; H04L 67/327; H04W 4/20; G06Q 30/0269; G06Q 30/0271
See application file for complete search history.

(56) References Cited

U.S. PATENT DOCUMENTS 3,786,424 A    1/1974   McVoy et al.
5,751,928 A    5/1998   Bakalash
(Continued)

FOREIGN PATENT DOCUMENTS

AU    2009296500    1/2013
AU    2009296744    1/2013
(Continued)

OTHER PUBLICATIONS

Canadian Office Action, re CA Application No. CA 2,730,310, dated May 16, 2014.
(Continued)

*Primary Examiner* — Yves Dalencourt
(74) *Attorney, Agent, or Firm* — Knobbe, Martens, Olson & Bear LLP

(57) ABSTRACT

A method for data forwarding storage and retrieval in a network of interconnected computer system nodes may include directing data to a computer memory, continuously forwarding the data, from one computer memory to anther computer memory in the network of interconnected computer system nodes without storing on any physical storage device in the network, and retrieving the data in response to an activity.

15 Claims, 17 Drawing Sheets

Related U.S. Application Data continuation of application No. 12/170,925, filed on Jul. 10, 2008, now Pat. No. 7,636,758, said application No. 13/735,759 is a continuation-in-part of application No. 13/003,505, filed as application No. PCT/US2009/049755 on Jul. 7, 2009, now Pat. No. 8,599,678, which is a continuation of application No. 12/170,901, filed on Jul. 10, 2008, now Pat. No. 7,673,009, said application No. 13/735,759 is a continuation-in-part of application No. 13/057,072, filed as application No. PCT/US2009/050008 on Jul. 9, 2009, now Pat. No. 8,356,078, which is a continuation of application No. 12/184,866, filed on Aug. 1, 2008, now Pat. No. 7,599,997, said application No. 13/735,759 is a continuation-in-part of application No. 12/989,638, filed as application No. PCT/US2009/041817 on Apr. 27, 2009, now Pat. No. 8,386,585, which is a continuation of application No. 12/109,458, filed on Apr. 25, 2008, now abandoned, said application No. 13/735,759 is a continuation-in-part of application No. 12/991,383, filed as application No. PCT/US2009/042971 on May 6, 2009, now Pat. No. 8,452,844, which is a continuation of application No. 12/116,610, filed on May 7, 2008, now abandoned, said application No. 13/735,759 is a continuation-in-part of application No. 13/119,133, filed as application No. PCT/US2009/058368 on Sep. 25, 2009, now Pat. No. 8,352,635, which is a continuation of application No. 12/240,925, filed on Sep. 29, 2008, now Pat. No. 7,631,051, said application No. 13/735,759 is a continuation-in-part of application No. 13/119,124, filed as application No. PCT/US2009/058362 on Sep. 25, 2009, now Pat. No. 8,489,687, which is a continuation of application No. 12/240,951, filed on Sep. 29, 2008, now Pat. No. 7,636,759, said application No. 13/735,759 is a continuation-in-part of application No. 13/119,122, filed as application No. PCT/US2009/058052 on Sep. 23, 2009, now Pat. No. 8,478,823, which is a continuation of application No. 12/240,967, filed on Sep. 29, 2008, now Pat. No. 7,636,760, said application No. 13/735,759 is a continuation-in-part of application No. 13/119,147, filed as application No. PCT/US2009/058376 on Sep. 25, 2009, now Pat. No. 8,554,866, which is a continuation of application No. 12/240,991, filed on Sep. 29, 2008, now Pat. No. 7,636,761, said application No. 13/735,759 is a continuation-in-part of application No. 12/052,345, filed on Mar. 20, 2008, now Pat. No. 8,458,285.

(56) References Cited

U.S. PATENT DOCUMENTS

| | | | |
|---|---|---|---|
| 5,774,553 | A | 6/1998 | Rosen |
| 5,787,258 | A | 7/1998 | Costa et al. |
| 5,796,715 | A | 8/1998 | Patterson et al. |
| 5,930,254 | A | 7/1999 | Liron et al. |
| 5,978,485 | A | 11/1999 | Rosen |
| 5,978,839 | A | 11/1999 | Okuhara et al. |
| 6,085,030 | A | 7/2000 | Whitehead et al. |
| 6,151,395 | A | 11/2000 | Harkins |
| 6,205,478 | B1 | 3/2001 | Sugano et al. |
| 6,219,691 | B1 | 4/2001 | Youn |
| 6,260,159 | B1 | 7/2001 | Garnett et al. |
| 6,298,380 | B1 | 10/2001 | Coile et al. |
| 6,505,213 | B1 | 1/2003 | Kamada et al. |
| 6,549,957 | B1 | 4/2003 | Hanson et al. |
| 6,587,866 | B1 | 7/2003 | Modi et al. |
| 6,650,640 | B1 | 11/2003 | Muller et al. |
| 6,677,976 | B2 | 1/2004 | Parker et al. |
| 6,684,258 | B1 | 1/2004 | Gavin et al. |
| 6,721,275 | B1 | 4/2004 | Rodeheffer et al. |
| 6,724,767 | B1 | 4/2004 | Chong et al. |
| 6,745,289 | B2 | 6/2004 | Gruner et al. |
| 6,907,447 | B1 | 6/2005 | Cooperman et al. |
| 6,941,338 | B1 | 9/2005 | Madsen |
| 6,983,303 | B2 | 1/2006 | Pellegrino et al. |
| 6,985,476 | B1 | 1/2006 | Elliott et al. |
| 7,007,142 | B2 | 2/2006 | Smith |
| 7,035,933 | B2 | 4/2006 | O'Neal et al. |
| 7,043,530 | B2 | 5/2006 | Isaacs et al. |
| 7,061,923 | B2 | 6/2006 | Dugan et al. |
| 7,061,925 | B2 | 6/2006 | Joshi |
| 7,103,824 | B2 | 9/2006 | Halford |
| 7,120,631 | B1 | 10/2006 | Vahalia et al. |
| 7,136,638 | B2 | 11/2006 | Wacker et al. |
| 7,139,820 | B1 | 11/2006 | O'Toole, Jr. et al. |
| 7,143,170 | B2 | 11/2006 | Swildens et al. |
| 7,191,298 | B2 | 3/2007 | Kaminsky et al. |
| 7,197,576 | B1 | 3/2007 | Lo et al. |
| 7,209,973 | B2 | 4/2007 | Tormasov et al. |
| 7,218,952 | B1 | 5/2007 | Alperovich et al. |
| 7,240,214 | B2 | 7/2007 | Gazzetta et al. |
| 7,257,817 | B2 | 8/2007 | Cabrera et al. |
| 7,266,776 | B2 | 9/2007 | Quillen et al. |
| 7,274,706 | B1 | 9/2007 | Nguyen et al. |
| 7,277,941 | B2 | 10/2007 | Ignatius et al. |
| 7,295,556 | B2 | 11/2007 | Roese et al. |
| 7,320,059 | B1 | 1/2008 | Armangau et al. |
| 7,327,731 | B1 | 2/2008 | Kumar et al. |
| 7,346,063 | B1 | 3/2008 | Herbst |
| 7,346,909 | B1 | 3/2008 | Eldar et al. |
| 7,356,540 | B2 | 4/2008 | Smith et al. |
| 7,356,567 | B2 | 4/2008 | Odell et al. |
| 7,363,316 | B2 | 4/2008 | Anderson et al. |
| 7,366,868 | B2 | 4/2008 | Reuter et al. |
| 7,392,378 | B1 | 6/2008 | Elliott |
| 7,404,002 | B1 | 7/2008 | Pereira |
| 7,415,506 | B2 | 8/2008 | Gajjar et al. |
| 7,430,584 | B1 | 8/2008 | Fein et al. |
| 7,424,514 | B2 | 9/2008 | Noble et al. |
| 7,426,471 | B1 | 9/2008 | Briscoe et al. |
| 7,426,574 | B2 | 9/2008 | Liao |
| 7,426,637 | B2 | 9/2008 | Risan et al. |
| 7,426,745 | B2 | 9/2008 | McCarty |
| 7,428,219 | B2 | 9/2008 | Khosravi |
| 7,428,540 | B1 | 9/2008 | Coates et al. |
| 7,457,835 | B2 | 11/2008 | Toebes et al. |
| 7,529,784 | B2 | 5/2009 | Kavuri et al. |
| 7,599,997 | B1 | 10/2009 | Fein et al. |
| 7,631,051 | B1 | 12/2009 | Fein et al. |
| 7,631,052 | B2 | 12/2009 | Fein et al. |
| 7,636,758 | B1 | 12/2009 | Fein et al. |
| 7,636,759 | B1 | 12/2009 | Fein et al. |
| 7,636,760 | B1 | 12/2009 | Fein et al. |
| 7,636,761 | B1 | 12/2009 | Fein et al. |
| 7,636,762 | B1 | 12/2009 | Fein et al. |
| 7,636,763 | B1 | 12/2009 | Fein et al. |
| 7,636,764 | B1 | 12/2009 | Fein et al. |
| 7,668,926 | B2 | 2/2010 | Fein et al. |
| 7,668,927 | B2 | 2/2010 | Fein et al. |
| 7,673,009 | B2 | 3/2010 | Fein et al. |
| 7,685,248 | B1 | 3/2010 | Fein et al. |
| 7,707,287 | B2 | 4/2010 | Shafir et al. |
| 7,783,608 | B2 | 8/2010 | Shitomi |
| 7,844,695 | B2 | 11/2010 | Fein et al. |
| 7,865,586 | B2 | 1/2011 | Cohn |
| 7,877,456 | B2 | 1/2011 | Fein et al. |
| 7,924,888 | B2 | 4/2011 | Schultze et al. |
| 7,974,645 | B2 | 7/2011 | Choi-Grogan |
| 8,266,237 | B2 | 9/2012 | Moore et al. |
| 8,352,635 | B2 | 1/2013 | Fein et al. |
| 8,370,446 | B2 | 2/2013 | Fein et al. |
| 8,386,585 | B2 | 2/2013 | Fein et al. |
| 8,452,844 | B2 | 5/2013 | Fein et al. |
| 8,458,285 | B2 | 6/2013 | Fein et al. |

(56) References Cited

U.S. PATENT DOCUMENTS

| | | |
|---|---|---|
| 8,554,866 B2 | 10/2013 | Fein et al. |
| 8,599,678 B2 | 12/2013 | Fein et al. |
| 8,909,738 B2 | 12/2014 | Fein et al. |
| 9,203,928 B2 * | 12/2015 | Fein .................. G06Q 30/0269 |
| 2002/0059444 A1 | 5/2002 | Shinno |
| 2002/0158899 A1 | 10/2002 | Raymond |
| 2002/0194371 A1 | 12/2002 | Kadoi |
| 2003/0093463 A1 | 5/2003 | Graf |
| 2003/0101200 A1 | 5/2003 | Koyama et al. |
| 2003/0137880 A1 | 7/2003 | Barrenscheen et al. |
| 2003/0158958 A1 | 8/2003 | Chiu |
| 2004/0064633 A1 | 4/2004 | Oota |
| 2004/0093390 A1 | 5/2004 | Oberdorfer |
| 2004/0165525 A1 | 8/2004 | Burak |
| 2004/0223503 A1 | 11/2004 | Lynch et al. |
| 2004/0250029 A1 | 12/2004 | Ji et al. |
| 2005/0010647 A1 | 1/2005 | Durham |
| 2005/0010685 A1 | 1/2005 | Ramnath |
| 2005/0015466 A1 | 1/2005 | Tripp |
| 2005/0044162 A1 | 2/2005 | Liang et al. |
| 2005/0071568 A1 | 3/2005 | Yamamoto et al. |
| 2005/0131984 A1 | 6/2005 | Hofmann et al. |
| 2005/0201409 A1 | 9/2005 | Griswold et al. |
| 2005/0216473 A1 | 9/2005 | Aoyagi |
| 2005/0216727 A1 | 9/2005 | Chattopadhyay et al. |
| 2005/0240749 A1 | 10/2005 | Clemo et al. |
| 2005/0243823 A1 | 11/2005 | Griswold et al. |
| 2006/0031593 A1 | 2/2006 | Sinclair |
| 2006/0091007 A1 | 5/2006 | Inoue et al. |
| 2006/0095512 A1 | 5/2006 | Noma |
| 2006/0143505 A1 | 6/2006 | Olarig |
| 2006/0159456 A1 | 7/2006 | Gumaste et al. |
| 2006/0209822 A1 | 9/2006 | Hamamoto et al. |
| 2006/0212551 A1 | 9/2006 | Kao et al. |
| 2006/0242155 A1 | 10/2006 | Moore et al. |
| 2006/0242212 A1 | 10/2006 | Brinkmann et al. |
| 2007/0005694 A1 | 1/2007 | Popkin et al. |
| 2007/0011097 A1 | 1/2007 | Eckleder |
| 2007/0050446 A1 | 3/2007 | Moore |
| 2007/0050761 A1 | 3/2007 | Hester et al. |
| 2007/0055765 A1 | 3/2007 | Lisiecki et al. |
| 2007/0058606 A1 | 3/2007 | Koskelainen |
| 2007/0073775 A1 | 3/2007 | Walker et al. |
| 2007/0073965 A1 | 3/2007 | Rajakarunanayake |
| 2007/0079087 A1 | 4/2007 | Wang et al. |
| 2007/0171832 A1 | 6/2007 | Agmon et al. |
| 2007/0186068 A1 | 8/2007 | Agrawal |
| 2007/0195772 A1 | 8/2007 | Shadish |
| 2007/0214105 A1 | 9/2007 | Sfarti et al. |
| 2007/0266220 A1 | 11/2007 | Nelson |
| 2007/0271349 A1 | 11/2007 | Clemo et al. |
| 2008/0013448 A1 | 1/2008 | Horie et al. |
| 2008/0016564 A1 | 1/2008 | Claudatos et al. |
| 2008/0037777 A1 | 2/2008 | Ignatius et al. |
| 2008/0059495 A1 | 3/2008 | Kiessig et al. |
| 2008/0071855 A1 | 3/2008 | Farber et al. |
| 2008/0084330 A1 | 4/2008 | Picard |
| 2008/0091744 A1 | 4/2008 | Shitomi et al. |
| 2008/0095075 A1 | 4/2008 | Monier |
| 2008/0101277 A1 | 5/2008 | Taylor et al. |
| 2008/0104085 A1 | 5/2008 | Papoutsakis et al. |
| 2008/0114891 A1 | 5/2008 | Pereira |
| 2008/0144655 A1 | 6/2008 | Beam et al. |
| 2008/0151893 A1 | 6/2008 | Nordmark et al. |
| 2008/0155094 A1 | 6/2008 | Roese et al. |
| 2008/0155252 A1 | 6/2008 | Nambiar |
| 2008/0155275 A1 | 6/2008 | Natarajan et al. |
| 2008/0155537 A1 | 6/2008 | Dinta et al. |
| 2008/0181224 A1 | 7/2008 | Van Hensbergen et al. |
| 2008/0222415 A1 | 9/2008 | Munger et al. |
| 2008/0222492 A1 | 9/2008 | Earhart et al. |
| 2008/0225842 A1 | 9/2008 | Goldfein et al. |
| 2008/0225888 A1 | 9/2008 | Valluri et al. |
| 2008/0228943 A1 | 9/2008 | Balus et al. |
| 2008/0313318 A1 | 12/2008 | Vermeulen et al. |
| 2009/0006808 A1 | 1/2009 | Blumrich et al. |
| 2009/0036171 A1 | 2/2009 | Palenius |
| 2009/0063187 A1 | 3/2009 | Johnson et al. |
| 2009/0063419 A1 | 3/2009 | Nurminen et al. |
| 2009/0067322 A1 * | 3/2009 | Shand .................. H04L 45/00 370/225 |
| 2009/0092124 A1 | 4/2009 | Singhal et al. |
| 2009/0104978 A1 | 4/2009 | Ben-Ami |
| 2009/0141621 A1 | 6/2009 | Fan et al. |
| 2009/0204320 A1 | 8/2009 | Shaffer et al. |
| 2009/0228593 A1 | 9/2009 | Takeda |
| 2009/0234933 A1 | 9/2009 | Fein et al. |
| 2009/0238167 A1 | 9/2009 | Fein et al. |
| 2009/0254567 A1 | 10/2009 | Fein et al. |
| 2009/0300635 A1 | 12/2009 | Ferris |
| 2010/0185581 A1 | 7/2010 | Bakalash |
| 2011/0125721 A1 | 5/2011 | Fein |
| 2011/0138075 A1 | 6/2011 | Fein |
| 2011/0167131 A1 | 7/2011 | Fein |
| 2011/0179131 A1 | 7/2011 | Fein |
| 2011/0258049 A1 * | 10/2011 | Ramer .............. G06F 17/30867 705/14.66 |
| 2013/0124336 A1 | 5/2013 | Fein |

FOREIGN PATENT DOCUMENTS

| | | |
|---|---|---|
| AU | 2009240392 | 2/2013 |
| AU | 2009244352 | 2/2013 |
| AU | 2009276965 | 2/2013 |
| AU | 2009296495 | 2/2013 |
| AU | 2009268716 | 3/2013 |
| AU | 2009296496 | 3/2013 |
| AU | 2009225859 | 9/2013 |
| AU | 2009268792 | 10/2013 |
| AU | 2009296490 | 11/2013 |
| CN | 1529964 | 9/2004 |
| CN | 1823506 | 8/2006 |
| CN | 1855857 | 11/2006 |
| CN | 101188569 | 5/2008 |
| CN | 101330451 A | 12/2008 |
| CN | 102016820 A | 4/2011 |
| CN | 102016828 A | 4/2011 |
| EP | 0 458 567 | 5/1991 |
| EP | 0 722 591 | 6/1999 |
| EP | 1 048 998 | 11/2000 |
| EP | 1 266 308 | 12/2002 |
| EP | 1 968 257 | 9/2003 |
| EP | 1 357 476 A | 10/2003 |
| EP | 1406446 A1 | 4/2004 |
| EP | 1 802 051 | 11/2006 |
| EP | 1322068 B1 | 11/2006 |
| EP | 1 746 790 | 1/2007 |
| EP | 1 372 316 | 5/2007 |
| EP | 1798934 A1 | 6/2007 |
| EP | 1798937 A1 | 6/2007 |
| EP | 1826968 A1 | 8/2007 |
| EP | 1485787 B1 | 10/2007 |
| EP | 1776639 B1 | 12/2007 |
| EP | 1479236 B1 | 1/2008 |
| EP | 1 931 090 | 6/2008 |
| JP | 56-013857 | 2/1981 |
| JP | 56-116144 | 9/1981 |
| JP | 56-116145 | 9/1981 |
| JP | 60-241346 | 11/1985 |
| JP | 61-163757 | 7/1986 |
| JP | 61-165889 | 7/1986 |
| JP | 06-021953 | 1/1994 |
| JP | 06-068047 | 3/1994 |
| JP | 10-254761 | 9/1998 |
| JP | 11-065911 | 3/1999 |
| JP | 2002-510409 | 4/2002 |
| JP | 2002-268952 | 9/2002 |
| JP | 2003-296176 | 10/2003 |
| JP | 2003-296179 | 10/2003 |
| JP | 2005-070987 | 3/2005 |
| JP | 2005-216241 | 8/2005 |
| JP | 2005-275937 | 10/2005 |
| JP | 2005-310126 | 11/2005 |
| JP | 2005-339325 | 12/2005 |

(56) References Cited

FOREIGN PATENT DOCUMENTS

| JP | 2007-304665 | 11/2007 |
|---|---|---|
| JP | 2007-310673 | 11/2007 |
| JP | 2008-033406 | 2/2008 |
| JP | 2008-052340 | 3/2008 |
| JP | 2008-516304 | 5/2008 |
| JP | 2008-192129 | 8/2008 |
| JP | 2008-537258 | 9/2008 |
| JP | 2011-519097 | 6/2011 |
| JP | 2011-523120 | 8/2011 |
| JP | 2011-528141 | 11/2011 |
| WO | WO 1994/04991 | 3/1994 |
| WO | WO 1997/19427 A2 | 5/1997 |
| WO | WO 1997/19427 A3 | 5/1997 |
| WO | WO 2001/67303 | 9/2001 |
| WO | WO 2002/052417 | 7/2002 |
| WO | WO 2003/009544 | 1/2003 |
| WO | WO 2004/059529 | 7/2004 |
| WO | WO 2005/034441 | 4/2005 |
| WO | WO 2005/062578 | 7/2005 |
| WO | WO 2006/026567 | 3/2006 |
| WO | WO 2006/115594 | 11/2006 |
| WO | WO 2006/124084 | 11/2006 |
| WO | WO 2006/124217 | 11/2006 |
| WO | WO 2007/001631 | 1/2007 |
| WO | WO 2007/019689 | 2/2007 |
| WO | WO 2009/021289 | 2/2007 |
| WO | WO 2007/031593 | 3/2007 |
| WO | WO 2008/006079 | 1/2008 |
| WO | WO 2008/013036 | 1/2008 |
| WO | WO 2008/070958 | 6/2008 |
| WO | WO 2008/094930 | 8/2008 |
| WO | WO 2008/108699 | 9/2008 |
| WO | WO 2008/109390 | 9/2008 |
| WO | WO 2009/117259 | 9/2009 |
| WO | WO 2009/126418 | 10/2009 |
| WO | WO 2009/132345 | 10/2009 |
| WO | WO 2009/137571 | 11/2009 |
| WO | WO 2010/005928 | 1/2010 |
| WO | WO 2010/005935 | 1/2010 |
| WO | WO 2010/014368 | 2/2010 |
| WO | WO 2010/036712 | 4/2010 |
| WO | WO 2010/036881 | 4/2010 |
| WO | WO 2010/036883 | 4/2010 |
| WO | WO 2010/036886 | 4/2010 |
| WO | WO 2010/036887 | 4/2010 |
| WO | WO 2010/036891 | 4/2010 |

OTHER PUBLICATIONS

EPO, Examination Report re EPO App. No. 09734559.9, dated Apr. 18, 2016.
European Exam Report, re EP Application No. 09795034.9, dated Jan. 26, 2016.
Japanese Office Action, re JP Application No. 2011-529253, dated Mar. 19, 2015.
Japanese Office Action re JP Application No. JP 2011-517508, dated Dec. 11, 2015.
U.S. Notice of Allowance dated Jun. 10, 2013, re U.S. Appl. No. 13/119,147.
U.S. Interview Summary dated Feb. 4, 2015, re U.S. Appl. No. 13/735,759.
U.S. Office Action dated Nov. 21, 2014, re U.S. Appl. No. 13/735,759.
U.S. Final Office Action dated May 18, 2015, re U.S. Appl. No. 13/735,759.
U.S. Notice of Allowance dated Jul. 24, 2015, re U.S. Appl. No. 13/735,759.
U.S. Office Action Response dated Feb. 20, 2015, re U.S. Appl. No. 13/735,759.
U.S. Final Office Action Response dated Jun. 22, 2015, re U.S. Appl. No. 13/735,759.
Supplementary European Search Report for European Application No. 09816899 dated Sep. 15, 2016.
Supplementary European Search Report for European Application No. 09816798.4, dated Aug. 19, 2016.
Akasaka, Tsutomu, "Remote Copy Technology of ETERNUS6000 and ETERNUS3000 Disk Arrays", Fujitsu Sci. Tech. J., Jan. 2006, vol. 42, Issue 1, pp. 9-16.
Amazon Elastic Compute Cloud (Amazon EC2)—Limited Beta, Amazon.com: Amazon EC2, Amazon Elastic Compute Cloud, Virtual Grid Computing: . . . p. 1 of 9, http://web.archive.org/web/20070705164650rn_2/www.amazon.com/b?ie=UTF8&node=2 . . . Jun. 18, 2010.
Aref, et al.: "Nile: A Query Processing Engine for Data Streams", Department of Computer Sciences Purdue University, West Lafayette, IN., USA, Data Engineering, 2004. Proceedings. 20th International Conference on Mar. 30-Apr. 2, 2004.
Ari, Ismail: "Design and Management of Globally-Distributed Network Caches", University of California Santa Cruz, Sep. 2004, 220 pages.
Australian Office Action (Exam Report No. 2) re AU Application No. 2009240392, dated Sep. 25, 2012.
Australian Office Action re AU Application No. 2009240392, dated May 1, 2012.
Australian Office Action re AU Application No. 2009268792, dated Jun. 8, 2012.
Australian Office Action re AU Application No. 2009268792, dated Nov. 13, 2012.
Australian Office Action, re AU Application No. 2009-268716, dated Feb. 29, 2012.
Australian Office Action, re AU Application No. 2009276965, dated Mar. 22, 2012.
Australian Office Action, re AU Application No. 2009296495, dated Apr. 5, 2012.
Australian Office Action, re AU Application No. 2009296496, dated May 23, 2012.
Australian Office Action, re AU Application No. 2009296500, dated Apr. 13, 2012.
Australian Office Action, re AU Application No. 2009296744, dated Apr. 19, 2012.
Australian Exam Report, re AU Application No. 2009296500, dated Oct. 24, 2012.
Australian Office Action, re AU Application No. 2009296490, issued Feb. 4, 2013.
Balon, S. et al.: "A scalable and decentralized fast-rerouting scheme with efficient bandwidth sharing," Comptuer Networks 50 (2006) 3043-3063.
Bryant, S., et al. "Internet Draft IP Reroute Using Not-via Addresses," Jul. 2007, (vol. rtgwg, No. 1, XPo15051639, ISSN: 0000-0004).
Canadian Office Action, re CA Application No. CA 2,727,457, dated May 9, 2013.
Canadian Office action, re CA Application No. CA 2,738,634, dated Dec. 20, 2031.
Canadian Office Action, re CA Application No. CA 2722,415, dated Feb. 18, 2014.
Canadian Office Action, re CA Application No. CA 2722,415, dated Mar. 25, 2013.
Cheeha Kim, "An Efficient Multicast Data Forwarding Scheme for Mobile Ad Hoc Networks", Information Networking, Convergence in Broadband and Mobile Networking, International Conf., Lecture Notes in Computer Science, Jan. 31-Feb. 2, 2005, vol. 3391/2005, 510-519, DOI: 10.1007/978-3-540-30582-8_53.
Chinese Notice of Rejection, re CN Application No. 200980109783.4, dated Nov. 20, 2013. (With Machine Translation).
Chinese Office Action, re CN Application No. 200980126972.2, dated Sep. 2, 2013. w/machine translation.
Chinese Office Action, Second, re CN Application No. 200980138485.8, dated May 30, 2013.
Chinese Office Action, re CN Application No. 200980126972.2, dated Mar. 17, 2014. w/machine translation.
Chou, et al.: "Dynamic route mainenance for geographic forwarding in mobile ad hoc networks," Computer Networks 52 (2008) 418-431.

(56) References Cited

OTHER PUBLICATIONS

EPO Exam Report re App. No. 09723251.6, dated Nov. 11, 2010.
EPO, Extended Search Report re EPO App. No. 09734559.9, dated Jul. 25, 2011.
Ertaul et al.: "ECC Based Threshold Cryptography for Secure Data Forwarding and Secure Key Exchange in MANET (I)", LNCS 3462, pp. 102-113, Networking 2005, May 2-6, 2005 University of Waterloo, Waterloo Ontario Canada.
Ertaul et al: "Implementation of Homomorphic Encryption Schemes for Secure Packet Forwarding in Mobile Ad Hoc Networks (MANETs)", IJCSNS, vol. 7, Issue No. 11, pp. 132-141, Nov. 2007.
European Extended Search Report, re EP Application No. 09743557.2 dated Nov. 9, 2012.
European Extended Search Report, re EP Application No. 09795041, dated Oct. 11, 2011.
European Extended Search Report, re EP Application No. 09816904.8, dated Feb. 6, 2012.
European Office Action, re EP Application No. 09795041, dated Aug. 9, 2012.
European Supplemental Search Report, re EP Application No. 09795034.9, dated Nov. 7, 2011.
European Examination Report, re EP Application No. 09743557.2 dated Jul. 18, 2014.
European Supplemental Search Report re EPO Application No. 09 81 6907, dated Jul. 10, 2014.
European Extended Search Report, re EP Application No. 09816903.0 (PCT/US2009)058367), dated Jan. 5, 2015.
European Office Action for European Application No. 09795034.9 dated Jan. 26, 2016.
Girao et al.: "TinyPEDS: Tiny Persistent Encrypted Data Storage in Asynchronous Wireless Sensor Networks", Ad Hoc Networks, vol. 5, Issue 7, p. 1073-1089 (Sep. 2007).
Hirose, et al., "Computer Software Dictionary," Japan, Maruzen Company, Limited, Apr. 5, 1996, third printing, pp. 92-93 and 106-107.
Hoke, et al.: "InteMon: Continuous Mining of Sensor Data in Large-scale Self-* Infrastructures", Carnegie Mellon University. Appears in ACM SIGOPS Operating Systems Review, 40(3): pp. 38-44. ACM Press, Jul. 2006.
Huang et al., "Secure Data Forwarding in Wireless Ad Hoc Networks", IEEE International Conference, May 16-20, 2005, pp. 3535-3531, vol. 5.
Ito, Takeshi et al. "Technologies of ETERNUSVS900 Storage Virtualization Switch", Fujitsu Sci. Tech. J., Jan. 2006, vol. 42, Issue 1, pp. 17-23.
Japanese Decision of Rejection re JP Application No. 2011-529255, dated Nov. 14, 2012.
Japanese Office Action (Notice of Rejection), re JP Application No. JP 2011-500858, dated May 29, 2012.
Japanese Office Action dated Apr. 13, 2012, re JP App. No. 2011-517515.
Japanese Office Action re JP Application No. 2011-529185, dated Jan. 23, 2013.
Japanese Office Action re JP Application No. 2011-529255, dated Apr. 26, 2012.
Japanese Office Action re JP Application No. JP 2011-521163, dated May 23, 2012.
Japanese Office Action re JP Application No. 2011-508626, dated Sep. 27, 2012.
Japanese Office Action, re JP App. No. 2011-529258, dated Apr. 26, 2012.
Japanese Office Action, re JP Application No. 2011-504044, dated Sep. 4, 2012.
Japanese Office Action, re JP Application No. 2011-506496, dated Mar. 21, 2012.
Japanese Office Action dated Mar. 19, 2013, re JP App. No. 2011-517515 w/Machine Trans.
Japanese Office Action re JP Application No. 2011-529185, dated Aug. 22, 2013.
Japanese Office Action re JP Application No. 2011-529256, dated Aug. 22, 2013.
Japanese Office Action re JP Application No. 2011-529256, dated Mar. 12, 2013.
Japanese Office Action re JP Application No. JP 2011-517508, dated Aug. 2, 2013.
Japanese Office Action re JP Application No. JP 2011-517508, dated Feb. 27, 2013.
Japanese Office Action re JP Application No. JP 2011-517508, dated Feb. 4, 2014.
Japanese Office Action, re JP Application No. 2011-506496, dated Mar. 8, 2013.
Japanese Office Action, re JP Application No. 2011-529253, dated Feb. 13, 2013.
Japanese Decision of Rejection re JP Application No. JP 2011-517508, dated Oct. 2, 2014.
Japanese Decision of Dismissal of Amendment re JP Application No. JP 2011-517508, dated Oct. 2, 2014.
Japanese Office Action for Japanese Application No. 2011-529253 dated Mar. 19, 2015.
Ji, Lusheng et al., "On Providing Secure and Portable Wireless Data Networking Services: Architecture and Data Forwarding Mechanisms", IPSJ Journal, Oct. 2004, vol. 45, Issue 10, pp. 2261-2269.
Kim, Youngmin, "An Efficient Multicast Data Forwarding Scheme for Mobile Ad Hoc Networks", Information Networking, Convergence in Broadband and Mobile Networking, International Conf., 2005, vol. ICOIN 2005, Jeju Island, Korea, Jan. 31-Feb. 2, 2005.
Komandur et al., "SPAM: A Data Forwarding Model for Multipoint-to-Multipoint Connection Support in ATM Networks", IC3N, IEEE Computer Society, Sep. 1997, pp. 1-7.
Korean Office Action, re KR Application No. 10-2011-7000703, dated Jul. 16, 2012.
Korean Notice of Allowance re KR Application No. KR 10-2011-7009321, dated Apr. 30, 2103.
Korean Notice of Allowance, re KR Patent Application No. KR 10-2011-7009318, dated Mar. 19, 2013.
Mellor, Chris: "Storage in the cloud—Doppler shift or marketing gloss?", Storage in the cloud—Feature—Techworld.com, Published: 12:00, Dec. 18, 2007, http://features.techworld.com/storage/3893/storage-in-the-cloud/.
Na, et al.: "GLR: A novel geographic routing scheme for large wireless ad hoc networks," Computer Networks 50 (2006) 3434-3448.
Pakkala, et al.: "Towards a Peer-to-Peer Extended Content Delivery Network", pp. 1-5, XP002615892, retrieved from the Internet: URL:http://www.eurasip.org/Proceedings/Ext/IST05/papers/99.pdf on Jan. 7, 2011.
PCT International Preliminary Report and Report on Patentability re App. No. PCT/US2009/49763, dated Jan. 20, 2011.
PCT International Preliminary Report on Patentability and Written Opinion re App. No. PCT/US2009/041817, dated Oct. 26, 2010.
PCT International Preliminary Report on Patentability and Written Opinion re App. No. PCT/US2009/042971, dated Nov. 9, 2010.
PCT International Preliminary Report on Patentability and Written Opinion re App. No. PCT/US2009/49755, dated Jan. 20, 2011.
PCT International Preliminary Report on Patentability and Written Opinion re App. No. PCT/US2009/58052, dated Mar. 29, 2011.
PCT International Preliminary Report on Patentability and Written Opinion re App. No. PCT/US2009/58364, dated Mar. 29, 2011.
PCT International Preliminary Report on Patentability and Written Opinion re App. No. PCT/US2009/58367, dated Mar. 29, 2011.
PCT International Preliminary Report on Patentability and Written Opinion re App. No. PCT/US2009/58368, dated Mar. 29, 2011.
PCT International Preliminary Report on Patentability and Written Report re App. No. PCT/US2009/58376, dated Mar. 29, 2011, dated Apr. 7, 2011.
PCT International Report on Patentability and Written Opinion Re PCT/US2009/036171 dated Sep. 21, 2010.
PCT International Report on Patentability and Written Opinion re PCT/US2009/037579, dated Oct. 12, 2010.
PCT International Report on Patentability re App. No. PCT/US2009/50008, dated Feb. 10, 2011.

(56) References Cited

OTHER PUBLICATIONS

PCT International Search Report and Written Opinion, PCT/US2009/036171, dated Sep. 4, 2009 in 13 pgs.
PCT International Search Report and Written Opinion, PCT/US2009/037579, dated Jun. 24, 2009, 12 pages.
PCT International Search Report re App. No. PCT/US2009/41817, dated Jun. 30, 2009.
PCT International Search Report re App. No. PCT/US2009/42971, dated Jun. 24, 2009.
PCT International Search Report re App. No. PCT/US2009/49755, dated Aug. 7, 2009.
PCT International Search Report re App. No. PCT/US2009/49763, dated Oct. 16, 2009.
PCT International Search Report re App. No. PCT/US2009/50008, dated Aug. 11, 2009.
PCT International Search Report re App. No. PCT/US2009/58052, dated Nov. 4, 2009.
PCT International Search Report re App. No. PCT/US2009/58362, dated Nov. 2, 2009.
PCT International Search Report re App. No. PCT/US2009/58368, dated Oct. 26, 2009.
PCT International Search Report re App. No. PCT/US2009/58376, dated Oct. 28, 2009.
PCT International Search Report, re App. No. PCT/US2009/58364, dated Nov. 4, 2009.
PCT International Search Report, re App. No. PCT/US2009/58367, dated Oct. 26, 2009.
Pierre, et al.: "Globule: A Collaborative Content Delivery Network", IEEE Communications Magazine, vol. 44, No. 8, Aug. 1, 2006, pp. 127-133.
Previdi, Stefano: "IP Fast ReRoute Technologies," Asia Pacific Regional Internet Conference on Operational Technologies, APRICOT 2006, Mar. 2, 2006, pp. 1-60, XP055051142, Perth Australia.
Purczynski et al.: "Juggling with packets: floating data storage,", Internet Archive, Oct. 2003. [retrieved on Apr. 25, 2012]. Retrieved from the Internet<URL: http://web.archive.org/web/20031017082346/http://lcamtuf.coredump.cx/juggling_with_packets.txt.
Purczynski, et al.: "Juggling with packets: floating data storage," Internet Archive, Oct. 2003. [retrieved on Apr. 25, 2012]. Retrieved from the Internet<URL: http://web.archive.org/web/20031017082346/http://lcamtuf.coredump.cx/juggling_with_packets.txt>.
Sharma, et al.: "Data Warehouse and Olap Technology Part-1", power point presentation, first cited on Sep. 29, 2008 in U.S. Appl. No. 12/241,003.
Stefansson, et al.: "MyriadStore: Technical Report", Swedish Institute of Computer Science (SICS), Technical Report T2006:09, ISSN 1100-3154, ISRN: SCIS-T02006/09-SE. May 3, 2006 in 13 pages.
Tanenbaum, Andrew S.: "Network Protocols", Computing Surveys, vol. 13, No. 4, Dec. 1, 1981, pp. 453-489.
U.S. Interview Summary dated Aug. 8, 2012, re U.S. Appl. No. 12/989,638.
U.S. Interview Summary re U.S. Appl. No. 13/003,505, dated Sep. 20, 2012.
U.S. Non-Final Office Action dated May 14, 2009, re U.S. Appl. No. 12/132,804.
U.S. Notice of Allowance dated Aug. 7, 2008, re U.S. Appl. No. 12/046,757.
U.S. Notice of Allowance dated Jul. 15, 2009, re U.S. Appl. No. 12/132,804.
U.S. Notice of Allowance dated Jul. 26, 2010, re U.S. Appl. No. 12/240,802.
U.S. Notice of Allowance dated Sep. 15, 2010, re U.S. Appl. No. 12/099,498.
U.S. Office Action re U.S. Appl. No. 12/240,757, dated Jun. 22, 2009.
U.S. Office Action re U.S. Appl. No. 13/003,505, dated Aug. 22, 2012.
U.S. Interview Summary dated Aug. 6, 2012, re U.S. Appl. No. 12/991,383.
U.S. Interview Summary dated Aug. 6, 2012, re U.S. Appl. No. 13/057,072.
U.S. Interview Summary dated Aug. 6, 2012, re U.S. Appl. No. 13/119,124.
U.S. Interview Summary dated Aug. 7, 2012, re U.S. Appl. No. 13/003,502.
U.S. Interview Summary dated Aug. 7, 2012, re U.S. Appl. No. 13/119,122.
U.S. Interview Summary dated Aug. 7, 2012, re U.S. Appl. No. 13/119,147.
U.S. Interview Summary re U.S. Appl. No. 13/119,133, dated Aug. 7, 2012.
U.S. Non-Final Office Action dated Apr. 16, 2010, re U.S. Appl. No. 12/099,498.
U.S. Notice of Allowance dated Aug. 31, 2012, re U.S. Appl. No. 13/119,133.
U.S. Notice of Allowance dated Dec. 14, 2012, re U.S. Appl. No. 12/991,383.
U.S. Notice of Allowance dated Dec. 6, 2012, re U.S. Appl. No. 12/052,345.
U.S. Notice of Allowance dated Sep. 17, 2012, re U.S. Appl. No. 13/057,072.
U.S. Notice of Allowance re U.S. Appl. No. 12/052,345, dated Apr. 2, 2012.
U.S. Notice of Allowance re U.S. Appl. No. 12/052,345, dated Dec. 29, 2011.
U.S. Notice of Allowance re U.S. Appl. No. 12/989,638, dated Nov. 5, 2012.
U.S. Office Action re U.S. Appl. No. 12/052,345, dated Oct. 4, 2011.
U.S. Response to U.S. Office Action re U.S. Appl. No. 12/170,901, dated Jun. 12, 2009.
U.S. Response to U.S. Office Action re U.S. Appl. No. 12/170,925, dated Jul. 12, 2009.
U.S. Response to U.S. Office Action re U.S. Appl. No. 12/241,003, dated Jun. 11, 2009.
U.S. Interview Summary re U.S. Appl. No. 13/003,505, dated May 8, 2013.
U.S. Office Action re U.S. Appl. No. 13/003,505, dated Feb. 11, 2013.
U.S. Notice of Allowance dated Jul. 25, 2013, re U.S. Appl. No. 13/003,505.
U.S. Notice of Allowance re U.S. Appl. No. 13/119,122, dated Mar. 5, 2013.
U.S. Notice of Allowance re U.S. Appl. No. 13/119,124, dated Mar. 15, 2013.
Wagner, et al.: "A Network Application Programming Interface for Data Processing in Sensor Networks", Rice University Technical Report TREE0705. 10 pages, Submitted to IPSN (Jan. 2007)—http://www.citeulike.org/user/leosteinfeld/article/5146294.
Canadian Office Action, re CA Application No. CA 2730,310, dated May 16, 2014.
European Extended Search Report for European Application No. 09816798.4, dated Aug. 19, 2016.
U.S. Response to Interview Summary dated Feb. 20, 2015, re U.S. Appl. No. 13/735,759.
U.S. Final Amendment dated Jun. 22, 2015, re U.S. Appl. No. 13/735,759.

\* cited by examiner

DATA STORAGE AND RETRIEVAL

CROSS REFERENCE TO RELATED APPLICATIONS

This application is a continuation of U.S. application Ser. No. 13/735,759, filed Jan. 7, 2013, now U.S. Pat. No. 9,203,928 which is a continuation-in-part of each of the following:

U.S. application Ser. No. 13/003,502, filed Feb. 1, 2011, now U.S. Pat. No. 8,370,446 which is the U.S. National Phase of International Application No. PCT/US2009/049763, filed Jul. 7, 2009, which is a continuation of U.S. patent application Ser. No. 12/170,925, filed Jul. 10, 2008, now U.S. Pat. No. 7,636,758, each entitled "ADVERTISEMENT FORWARDING STORAGE"

U.S. application Ser. No. 13/003,505, filed Apr. 11, 2011, now U.S. Pat. No. 8,599,678 which is the U.S. National Phase of International Application No. PCT/US2009/049755, filed Jul. 7, 2009, which is a continuation of U.S. patent application Ser. No. 12/170,901, filed Jul. 10, 2008, now U.S. Pat. No. 7,673,009, each entitled "MEDIA DELIVERY IN DATA FORWARDING STORAGE NETWORK"

U.S. application Ser. No. 13/057,072, filed Feb. 1, 2011, now U.S. Pat. No. 8,356,078 which is the U.S. National Phase of International Application No. PCT/US2009/050008, filed Jul. 9, 2009, which is a continuation of U.S. patent application Ser. No. 12/184,866, filed Aug. 1, 2008, now U.S. Pat. No. 7,599,997, each entitled "MULTI-HOMED DATA FORWARDING STORAGE"

U.S. application Ser. No. 12/989,638, filed Feb. 25, 2011, now U.S. Pat. No. 8,386,585 which is the U.S. National Phase of International Application No. PCT/US2009/041817, filed Apr. 27, 2009, which is a continuation of U.S. patent application Ser. No. 12/109,458, filed Apr. 25, 2008, now abandoned, each entitled "REAL-TIME COMMUNICATIONS OVER DATA FORWARDING FRAMEWORK"

U.S. application Ser. No. 12/991,383, filed Jan. 24, 2011, now U.S. Pat. No. 8,452,844 which is the U.S. National Phase of International Application No. PCT/US2009/042971, filed May 6, 2009, which is a continuation of U.S. patent application Ser. No. 12/116,610, filed May 7, 2008, now abandoned, each entitled "DELETION IN DATA FILE FORWARDING FRAMEWORK"

U.S. application Ser. No. 13/119,133, filed Mar. 15, 2011, now U.S. Pat. No. 8,352,635 which is the U.S. National Phase of International Application No. PCT/US2009/058368, filed Sep. 25, 2009, which is a continuation of U.S. patent application Ser. No. 12/240,925, filed Sep. 29, 2008, now U.S. Pat. No. 7,631,051, each entitled "GEOLOCATION ASSISTED DATA FORWARDING STORAGE"

U.S. application Ser. No. 13/119,124, filed Mar. 15, 2011, now U.S. Pat. No. 8,489,687 which is the U.S. National Phase of International Application No. PCT/US2009/058362, filed Sep. 25, 2009, which is a continuation of U.S. patent application Ser. No. 12/240,951, filed Sep. 29, 2008, now U.S. Pat. No. 7,636,759, each entitled "ROTATING ENCRYPTION IN DATA FORWARDING STORAGE"

U.S. application Ser. No. 13/119,122, filed Mar. 15, 2011, now U.S. Pat. No. 8,478,823 which is the U.S. National Phase of International Application No. PCT/US2009/058052, filed Sep. 23, 2009, which is a continuation of U.S. patent application Ser. No. 12/240,967, filed Sep. 29, 2008, now U.S. Pat. No. 7,636,760, each entitled "SELECTIVE DATA FORWARDING STORAGE"

U.S. application Ser. No. 13/119,147, filed Mar. 15, 2011, now U.S. Pat. No. 8,554,866 which is the U.S. National Phase of International Application No. PCT/US2009/058376, filed Sep. 25, 2009, which is a continuation of U.S. patent application Ser. No. 12/240,991, filed Sep. 29, 2008, now U.S. Pat. No. 7,636,761, each entitled "MEASUREMENT IN DATA FORWARDING STORAGE"

U.S. application Ser. No. 12/052,345, filed Mar. 20, 2008, now U.S. Pat. No. 8,458,285 entitled "REDUNDANT DATA FORWARDING STORAGE."

Each of the above-listed references is hereby incorporated by reference in its entirety.

BACKGROUND

The volume of data that must be stored by individuals, organizations, businesses and government is growing every year. In addition to just keeping up with demand, organizations face other storage challenges. With the move to on-line, real-time business and government, critical data must be protected from loss or inaccessibility due to software or hardware failure. Today, many storage products do not provide complete failure protection and expose users to the risk of data loss or unavailability. For example, many storage solutions on the market today offer protection against some failure modes, such as processor failure, but not against others, such as disk drive failure. Many organizations are exposed to the risk of data loss or data unavailability due to component failure in their data storage system.

The data storage market is typically divided into two major segments, i.e., Direct Attached Storage (DAS) and Network Storage. DAS includes disks connected directly to a server.

Network Storage includes disks that are attached to a network rather than a specific server and can then be accessed and shared by other devices and applications on that network. Network Storage is typically divided into two segments, i.e., Storage Area Networks (SANs) and Network Attached Storage (NAS).

A SAN is a high-speed special-purpose network (or subnetwork) that interconnects different kinds of data storage devices with associated data servers on behalf of a larger network of users. Typically, a SAN is part of the overall network of computing resources for an enterprise. A storage area network is usually clustered in close proximity to other computing resources but may also extend to remote locations for backup and archival storage, using wide area (WAN) network carrier technologies.

NAS is hard disk storage that is set up with its own network address rather than being attached to the local computer that is serving applications to a network's workstation users. By removing storage access and its management from the local server, both application programming and files can be served faster because they are not competing for the same processor resources. The NAS is attached to a local area network (typically, an Ethernet network) and assigned an IP address. File requests are mapped by the main server to the NAS file server.

All of the above share one common feature that can be an Achilles tendon in more ways than one, i.e., data is stored on a physical medium, such as a disk drive, CD drive, and so forth.

BRIEF DESCRIPTION OF THE DRAWINGS

The embodiments are illustrated by way of example and not limitation in the figures of the accompanying drawings, in which like references indicate similar elements.

DETAILED DESCRIPTIONS

Unlike peer to peer networks, which use data forwarding in a transient fashion so that data is eventually stored on a physical medium such as a disk drive, the present invention is a continuous data forwarding system, i.e., data is stored by continually forwarding it from one node memory to another node memory.

Example Continuous Data Forwarding Frameworks

Figure 1A:
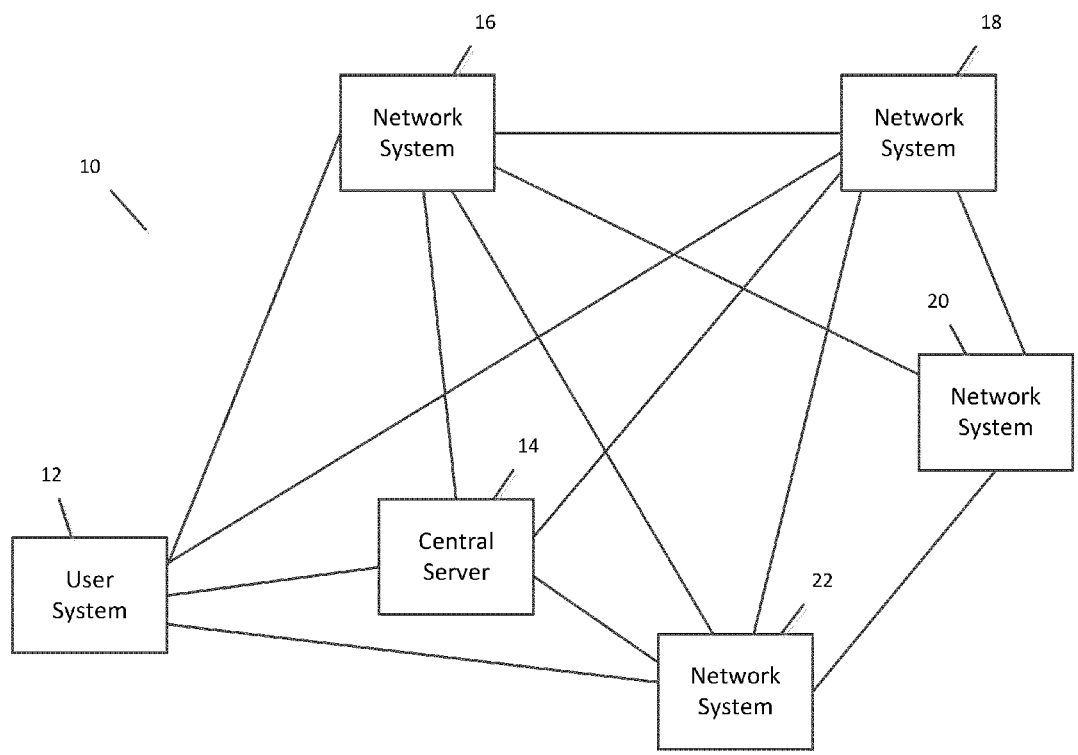
FIG. 1A is a block diagram of an exemplary network.

As shown in FIG. 1A, an exemplary network 10 includes a user system 12 and a number of network systems 14, 16, 18, 20, 22. Each of the network systems 14, 16, 18, 20, 22 can be considered to be a node in the network 10 and one such network system may be designated as a central server, such as network system 14, which may assume a control position in network 10. Each of the nodes 14, 16, 18, 20, 22 may be established as a privately controlled network of peers under direct control of the central server 14. Peered nodes may also be a mix of private and public nodes, and thus not under the direct physical control of the central server 14. The network 10 may also be wholly public where the central server 14 (or servers) has no direct ownership or direct physical control of any of the peered nodes.

Figure 1B:
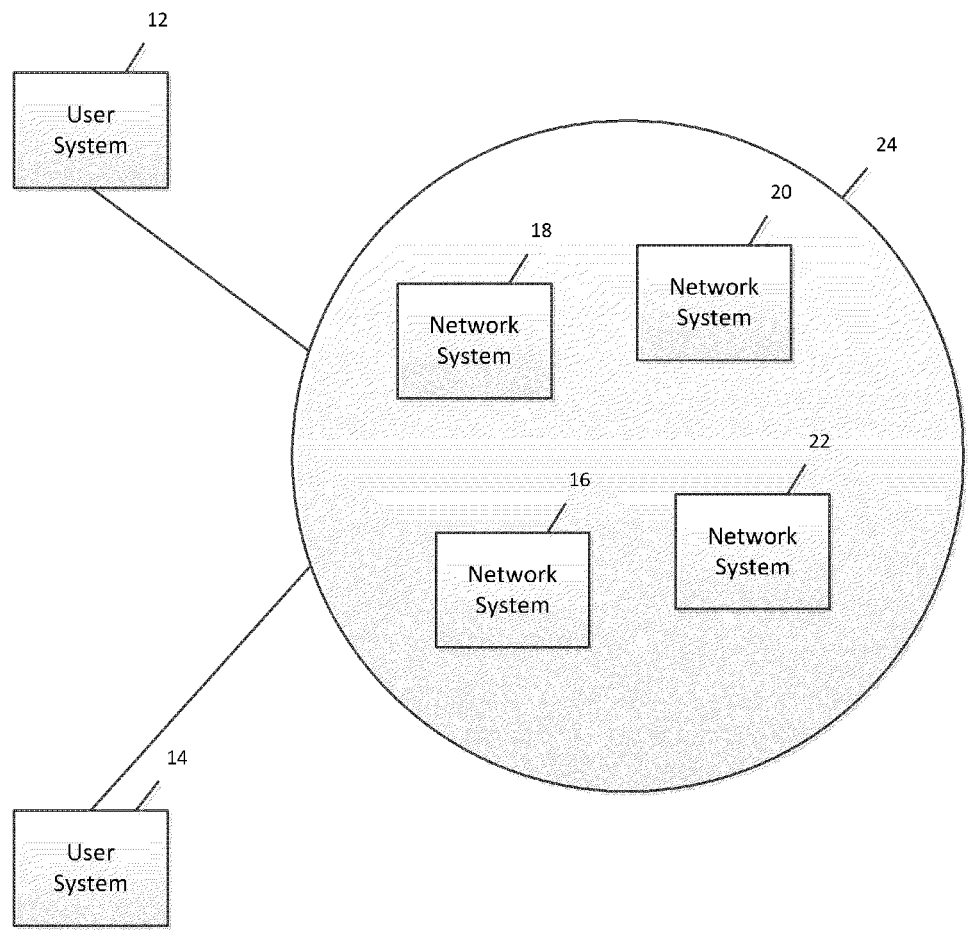
FIG. 1B is a block diagram of an exemplary continuous data forwarding framework including two user systems.

As shown in FIG. 1B, an exemplary continuously data forwarding framework 10 includes two user systems 12, 14 (also referred to as client systems) coupled to a number of network systems 16, 18, 20, 22 (also referred to as servers). Each of the network systems 16, 18, 20, 22 is considered to be a node in a network 24 and one such network system may be designated as a host or central server, such as network system 16. As such, network system 16 may assume a control position in network 24. Each of the nodes 16, 18, 20, 22 can be established as a privately controlled network of peers under direct control of the central server 16. Peered nodes can also be a mix of private and public nodes (e.g., the Internet), and thus not under the direct physical control of the central server 16. The network 24 can also be wholly public where the central server 16 (or servers) has no direct ownership or direct physical control of any of the peered nodes.

The continuously data forwarding framework 10 supports communications between computer users, such as users on user systems 12, 14. Computer users on user systems 12, 14 are distributed geographically and communicate using one or more of the network systems 16, 18, 20, 22 in network 24. User systems 12, 14 are connected to network 24 through various communication mediums, such as a modem connected to a telephone line (using, for example, serial line internet protocol (SLIP) or point-to-point protocol (PPP)) or a direct internetwork connection (using, for example, transmission control protocol/internet protocol (TCP/IP)).

Each of the user systems 12, 14 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. User systems 12, 14 may receive instructions from, for example, a software application, a program, a piece of code, a device, a computer, a computer system, or a combination thereof, which independently or collectively direct operations, as described herein. These instructions may take the form of one or more communications programs that facilitate communications between the users of client systems 12, 14. For instance, such communications programs may include E-mail programs, Instant Messaging (IM) programs, File Transfer Protocol (FTP) programs, Voice-over-Internet (VoIP) programs, as so forth. The instructions may be embodied permanently or temporarily in any type of machine, component, equipment, or storage medium.

Clients systems 12, 14 include a communications interface (not shown) used by the communications programs to send communications through network 24. The communications may include E-mail, audio data, video data, general binary data, or text data (e.g., encoded in American Standard Code for Information Interchange (ASCII) format).

The network 24 can include a series of portals interconnected through a coherent system. Examples of the network 24 include the Internet, Wide Area Networks (WANs), Local Area Networks (LANs), analog or digital wired and wireless telephone networks (e.g. a Public Switched Telephone Network (PSTN)), an Integrated Services Digital Network (ISDN), a Digital Subscriber Line (xDSL)), or any other wired or wireless network. The network 24 may include multiple networks or sub-networks, each of which may include, for example, a wired or wireless data pathway.

A central server 16 (also referred to as host server) may be connected to network 24 and may be used to facilitate some direct or indirect communications between the client systems 12, 14. As with the client systems 12, 14, central server 16 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Central server 16 may receive instructions from, for example, a software application, a program, a piece of code, a device, a computer, a computer system, or a combination thereof, which independently or collectively direct operations, as described herein. These instructions may take the form of one or more communications programs. For instance, such communications programs may include E-mail programs, IM programs, FTP programs, VoIP programs, and so forth. The instructions may be embodied permanently or temporarily in any type of machine, component, equipment, or storage medium.

Further, central server 16 includes a communications interface (not shown) used by the communications programs to send communications through network 24. The communications may include E-mail, audio data, video data, general binary data, or text data (e.g., encoded in American Standard Code for Information Interchange (ASCII) format).

The user systems 12, 14 can execute an instant messaging (IM) client program. IM programs typically enable users to communicate in real-time with each other in a variety of ways. Most IM programs provide, for example:

(1) Instant messages—send notes back and forth with a friend who is online (2) Chat—create a chat room with friends or co-workers (3) Web links—share links to your favorite Web sites (4) Video—send and view videos, and chat face to face with friends (5) Images—look at an image stored on your friend's computer (6) Sounds—play sounds for your friends (7) Files—share files by sending them directly to your friends (8) Talk—use the Internet instead of a phone to actually talk with friends (9) Streaming content—real-time or near-real-time stock quotes and news

(10) Mobile capabilities—send instant messages from your cell phone

Examples of IM communications include those provided by AIM (America Online™ Instant Messenger), Yahoo™ Messenger, MSN™ Messenger, and ICQ™, and so forth.

The framework 10 supports these IM communications and enables users to store video, images, sounds, files and other content, which can be included in IM communications. Unlike other systems, such as data storage networks, the framework 10 does not use fixed physical data storage to store data, such as image files and video files, for example. When a request to store data is received by the central server 16 from one of the user systems 12, 14, data is directed to a node in the network 24 where it is then continuously forwarded from node memory to node memory in the network 24 without storing on any physical storage medium such as a disk drive. The forwarded data resides only for a very brief period of time in the memory of any one node in the network 24. Data is not stored on any physical storage medium in any network node.

In a like manner, when a request to retrieve data is received by the central server 16 from a user system 12, 14, the requested data, which is being forwarded from node memory to node memory in the network 24, is retrieved.

Data forwarded in this manner can be segmented and segments forwarded as described above. Still, the segmented data is not stored on any physical storage medium in any network node, but merely forwarded from the memory of one node to the memory of another node.

Figure 1C:
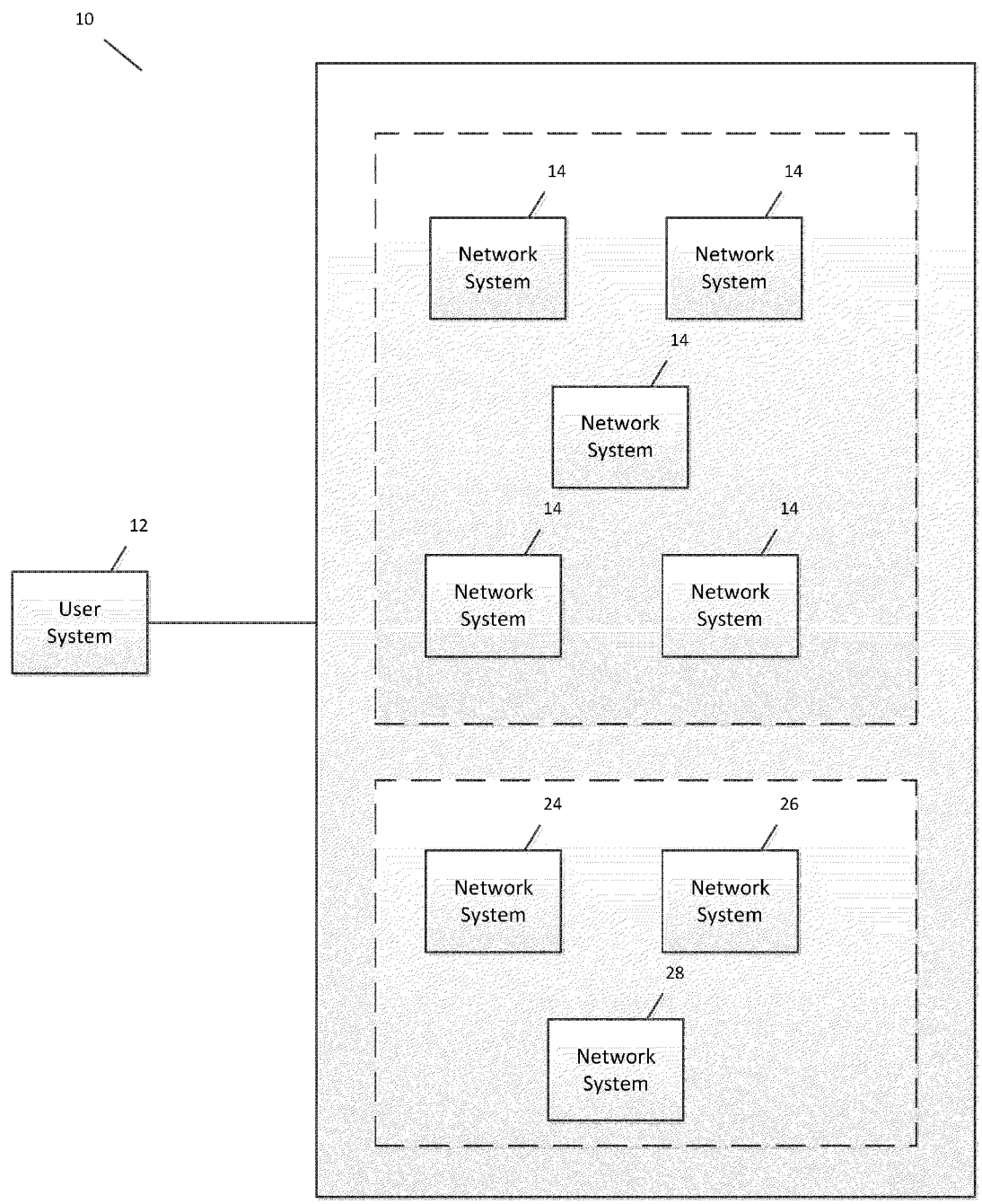
FIG. 1C is a block diagram of an exemplary framework that includes a user system and a number of network systems.

As shown in FIG. 1C, an exemplary framework 10A includes a user system 12 (also referred to as client systems) and a number of network systems 14, 16, 18, 20, 22. Each of the network systems 14, 16, 18, 20, 22 can be considered to be a node in the framework 10A and one such network system may be designated as a central server, such as network system 14, which may assume a control position in framework 10A. Each of the nodes 14, 16, 18, 20, 22 may be established as a privately controlled network of peers under direct control of the central server 14. Peered nodes may also be a mix of private and public nodes, and thus not under the direct physical control of the central server 14. The framework 10A may also be wholly public where the central server 14 (or servers) has no direct ownership or direct physical control of any of the peered nodes.

In one example, nodes 14, 16, 18, 20 and 22 are considered to be a private network. In a private network, an administrator controls the nodes and may designate which node is the central server. The framework 10A can also include one or more additional nodes, for example, nodes 24, 26 and 28. These nodes 24, 26 and 28 are considered to be part of one or more public networks in which the administrator has little or no control.

Example Selective Data Forwarding

In addition, when a request to store data is received, its ownership and/or data type can be checked against entries in a store maintained by the central server 14. For example, data owned by a paid subscriber may be forwarded from node memory to node memory, and/or data of a particular type, such as office productivity file data type, an audio data file type, a visual data file type, a video data file type, an object oriented file type and/or a database data file type. Thus, data forwarding is selective based on ownership and/or type. Certain users can have data forwarded from node memory to node memory, and/or certain types of data can be forwarded from node memory to node memory. Entries in the store can be added, modified or deleted, enabling even more flexibility in selectively forwarding data from node memory to node memory. Such a store can reside locally at the central server 14 or be forwarded from node memory to node memory without storing on any physical storage medium such as a disk drive. In addition to ownership and file type, other data parameters that can be evaluated include file size, file use frequency, user history, user preferences, and premiums paid by users.

Example User System

Figure 2:
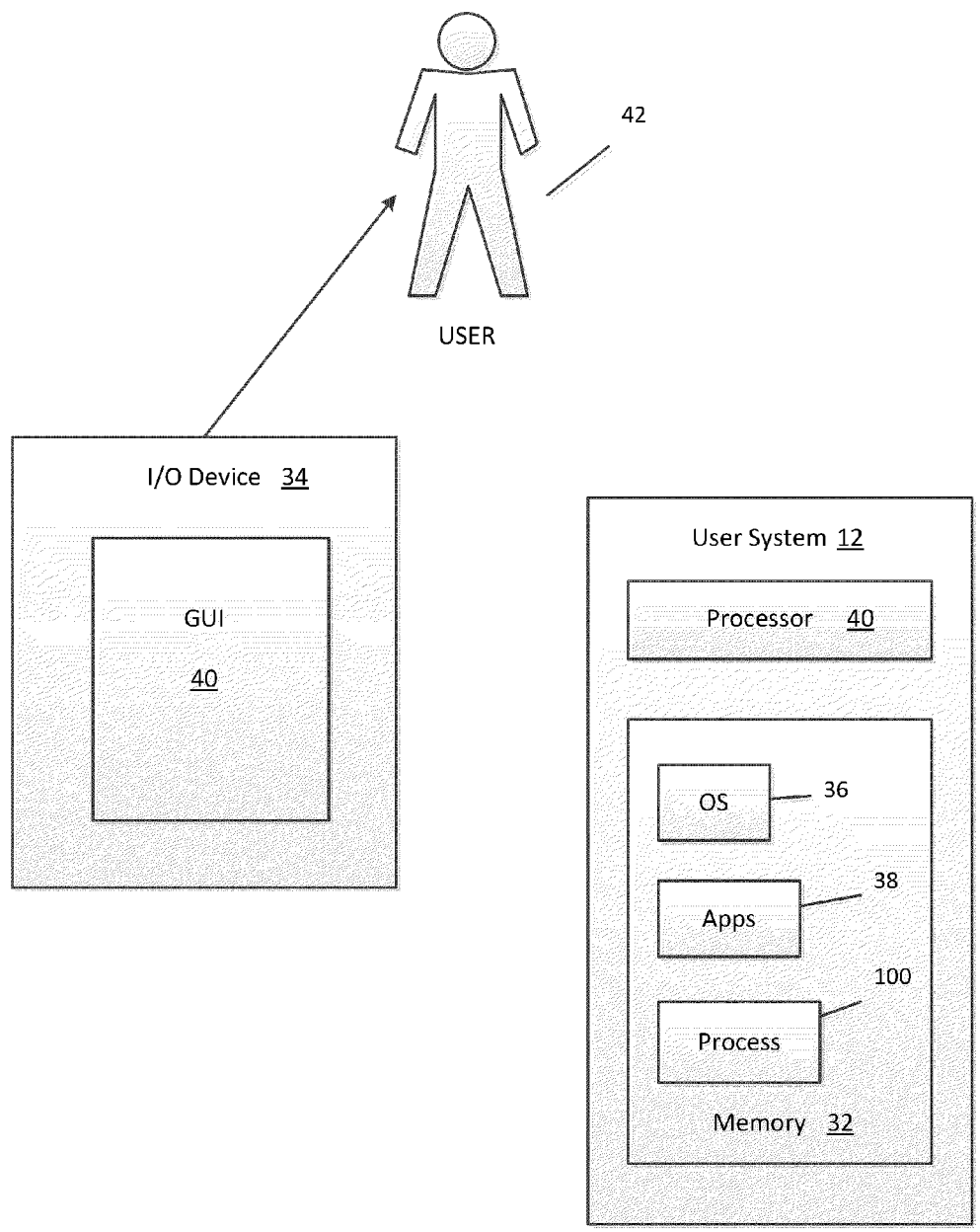
FIG. 2 is a block diagram of an exemplary user system.

As shown in FIG. 2, the user system 12 can include a processor 30, memory 32 and input/output (I/O) device 34. Memory 32 can include an operating system (OS) 36, such as Linux, Apple™ OS or Windows™, one or more application processes 38, and a storage process 100, explained in detail below. Application processes 38 can include user productivity software, such as OpenOffice or Microsoft Office™ The I/O device 34 can include a graphical user interface (GUI) 40 for display to a user 42.

Example Network Systems

Figure 3A:
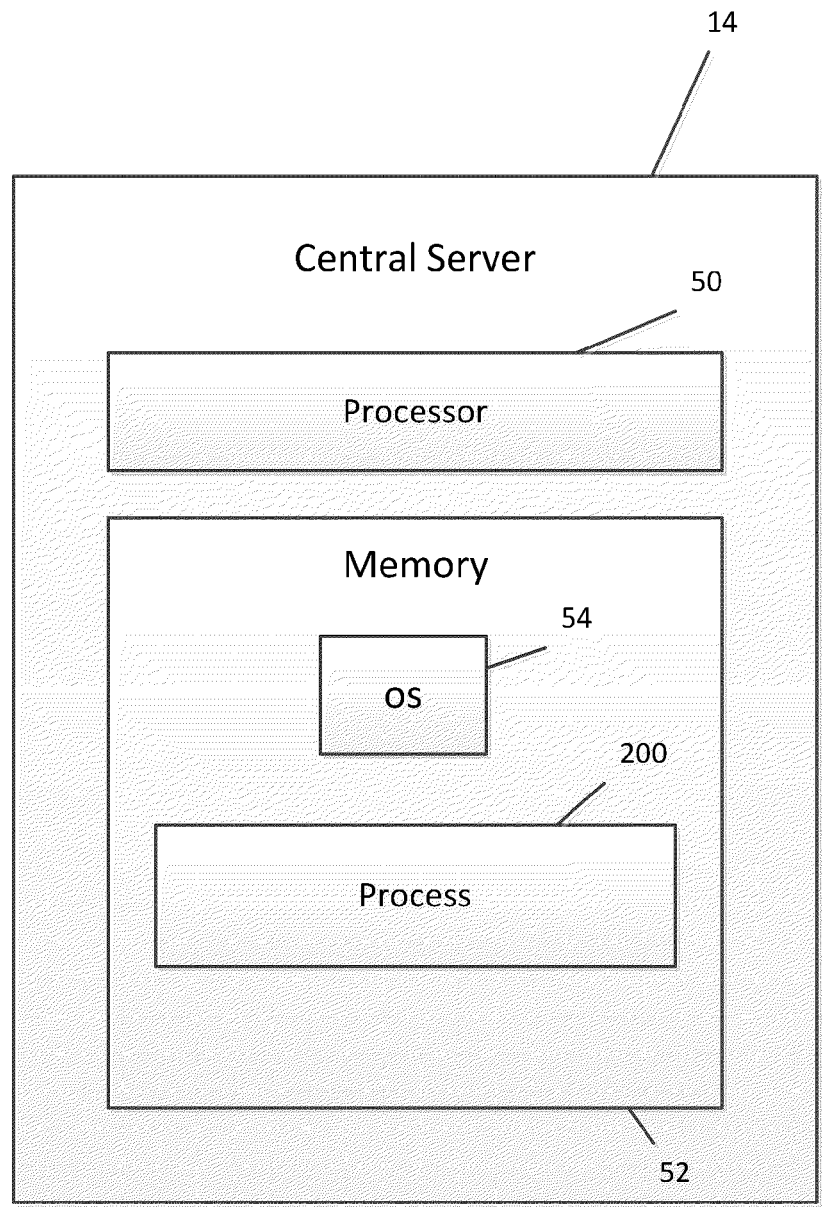
FIG. 3A is a block diagram of an exemplary network system.

As shown in FIG. 3A, each of the network systems, such as network system 14, can include a processor 50 and memory 52. Memory 52 can include an OS 54, such as Linux, Apple™ OS or Windows™, and a data forwarding process 200, explained in detail below.

Figure 3B:
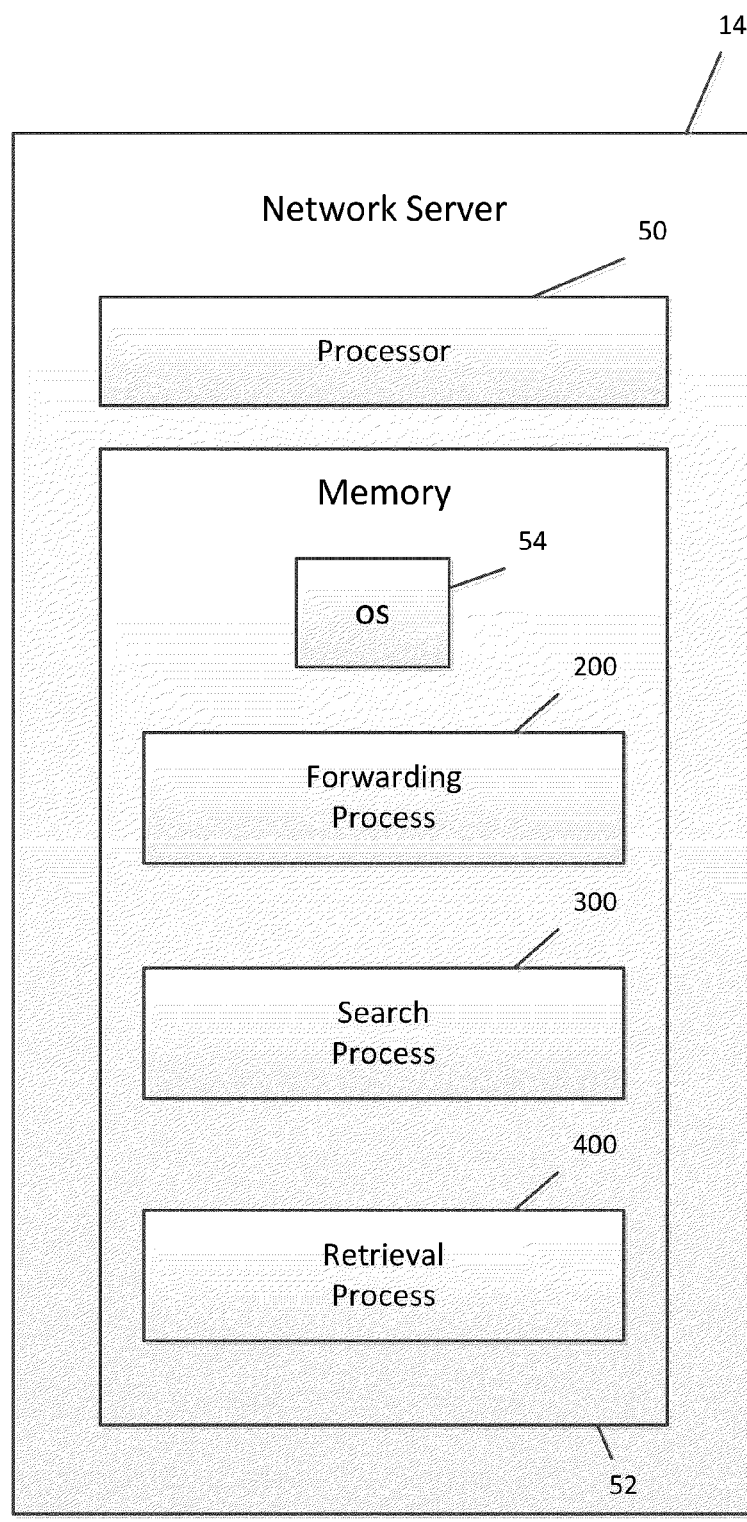
FIG. 3B is a block diagram of another exemplary network system.

As shown in FIG. 3B, each of the network systems, such as network system 14A (any reference herein to system 14 may refer to system 14 of FIG. 3A and/or system 14A of FIG. 3B), can include a processor 50 and memory 52. Memory 52 can include an OS 54, such as Linux, Apple™

OS or Windows™, a data file forwarding process 200, a search process 300 and a retrieval process 400, fully described below.

One network system, such as network system 22, is designated as a deletion node, more fully described below. Memory of the deletion node 22 does not include a data file forwarding process 200, search process 300 and retrieval process 400. Any data file received by the deletion node is not forwarded or saved. New data received in the memory of the deletion node overwrites old data received by the memory of the deletion node. In effect, the deletion node 22 acts as a black hole for data files forwarded to it.

In traditional systems, application processes 38 needs to store, delete, search and retrieve data files. In these traditional systems, a data file is stored on local or remote physical devices. And in some systems, this data file can be segmented into different pieces or packets and stored locally or remotely on physical mediums of storage. Use of fixed physical data storage devices add cost, maintenance, management and generate a fixed physical record of the data, whether or not that is the desire of the user 42.

The present invention as described in FIGS. 3A and 3B does not use fixed physical data storage to store data files. Herein, the terms "data file" are used to represent all file and media types handled by the system, such as, for example, files for data, program files, audio files, video files, picture files, and so forth. When a request to store a data file is received by the central server 14 from storage process 100, the data file is directed to a node memory in the framework 10 where it is then continuously forwarded from node memory to node memory in the framework 10 by the data file forwarding process 200 in each of the network nodes without storing on any physical storage medium, such as a disk drive. The forwarded data file resides only for a very brief period of time in the memory of any one node in the framework 10. Data files are not stored on any physical storage medium in any network node.

When a request to retrieve a data file is received by the central server 14 from storage process 100, the requested data file, which is being forwarded from node memory to node memory in the framework 10, is retrieved.

Data files forwarded in this manner can be segmented and segments forwarded as described above. Still, the segmented data is not stored on any physical storage medium in any network node, but forwarded from the memory of one node to the memory of another node.

Data files being forwarded in this manner can be deleted and thus no longer forwarded from node memory to node memory.

Example Storage Processes

Figure 4A:
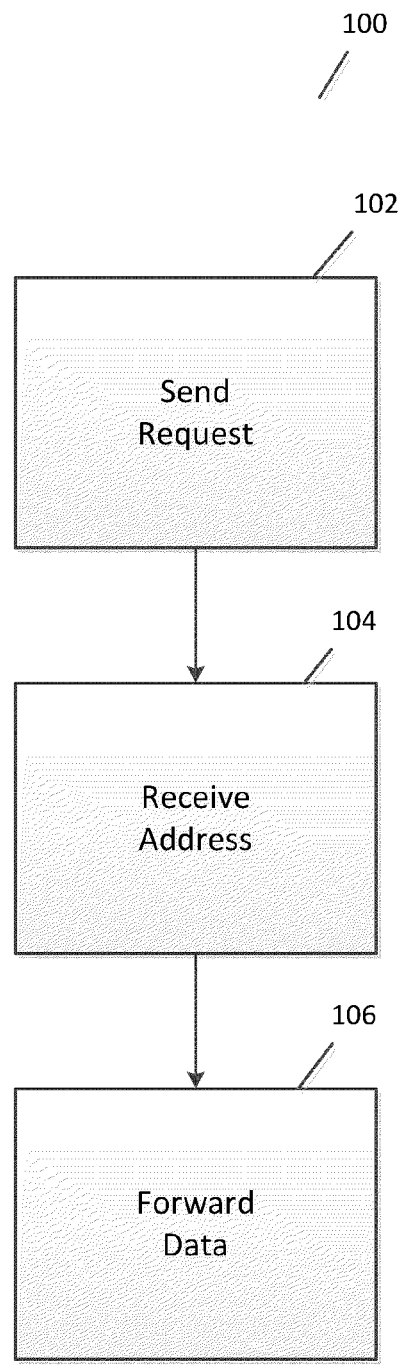
FIG. 4A is a flow diagram of an exemplary storage process.

As shown in FIG. 4A, storage process 100 includes sending (102) a request to a central server 14 to store or retrieve data. If the request is a retrieve data request, storage process 100 receives the requested data from the central server 14 or node in the network.

If the request to the central server 14 is a store data request, storage process 100 receives (104) an address of a node from the central server 14 and forwards (106) the data to the node memory represented by the received address. Determining an address of a node available to receive the data can be based on one or more factors, such as network traffic analysis, available memory, combinations of factors, and so forth. A time stamp can be applied to the data in the computer memory of the specific node.

Figure 4B:
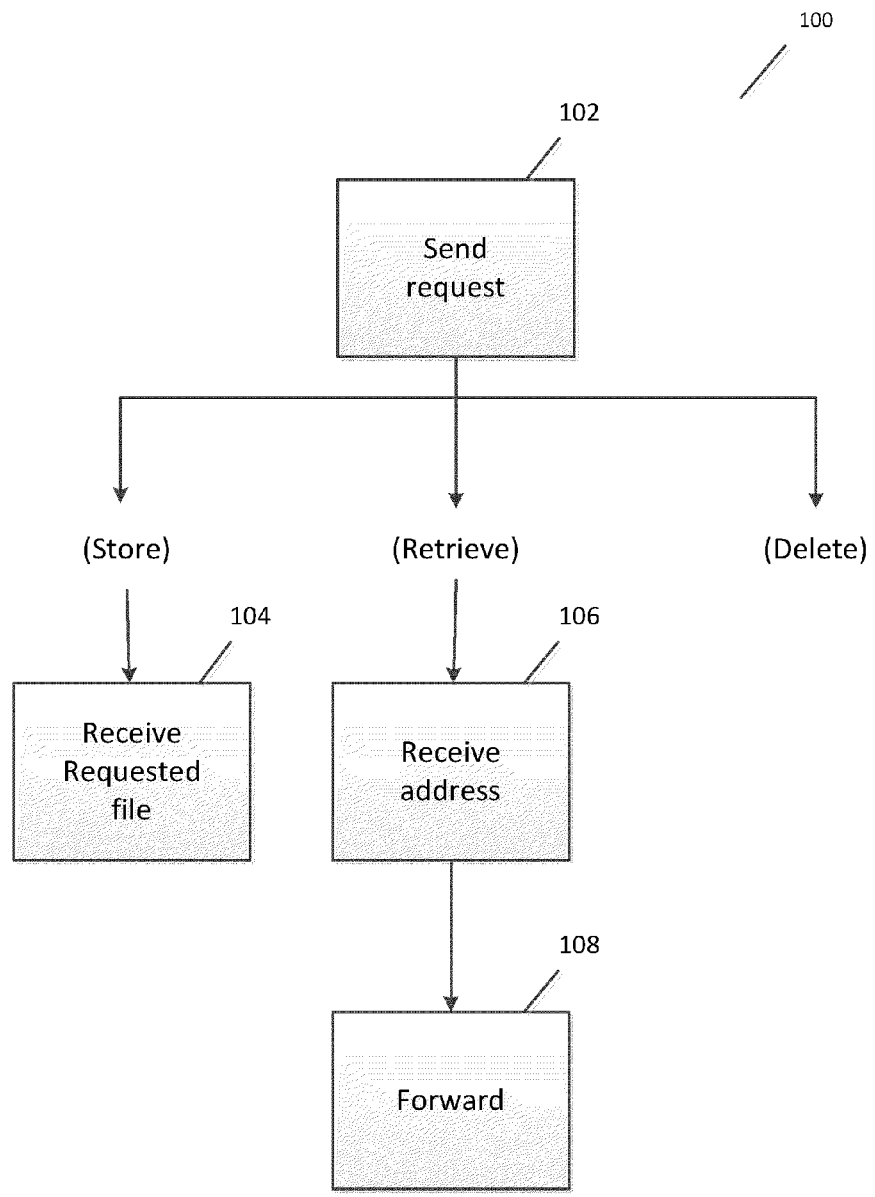
FIG. 4B is a flow diagram of another exemplary storage process.

As shown in FIG. 4B, storage process 100A includes sending (102) a request to a central server 14 to store, retrieve or delete a data file. If the request is a retrieve data file request, storage process 100 receives (104) the requested data file from the central server 14 or node in the network. Any reference herein to storage process 100 may refer to storage process 100 of FIG. 4A and/or storage system 100A of FIG. 4B.

If the request to the central server 14 is a store data file request, storage process 100 receives (106) an address of a node from the central server 14 and forwards (108) the data file to the node memory represented by the received address.

Example Data Forwarding Processes

Figure 5A:
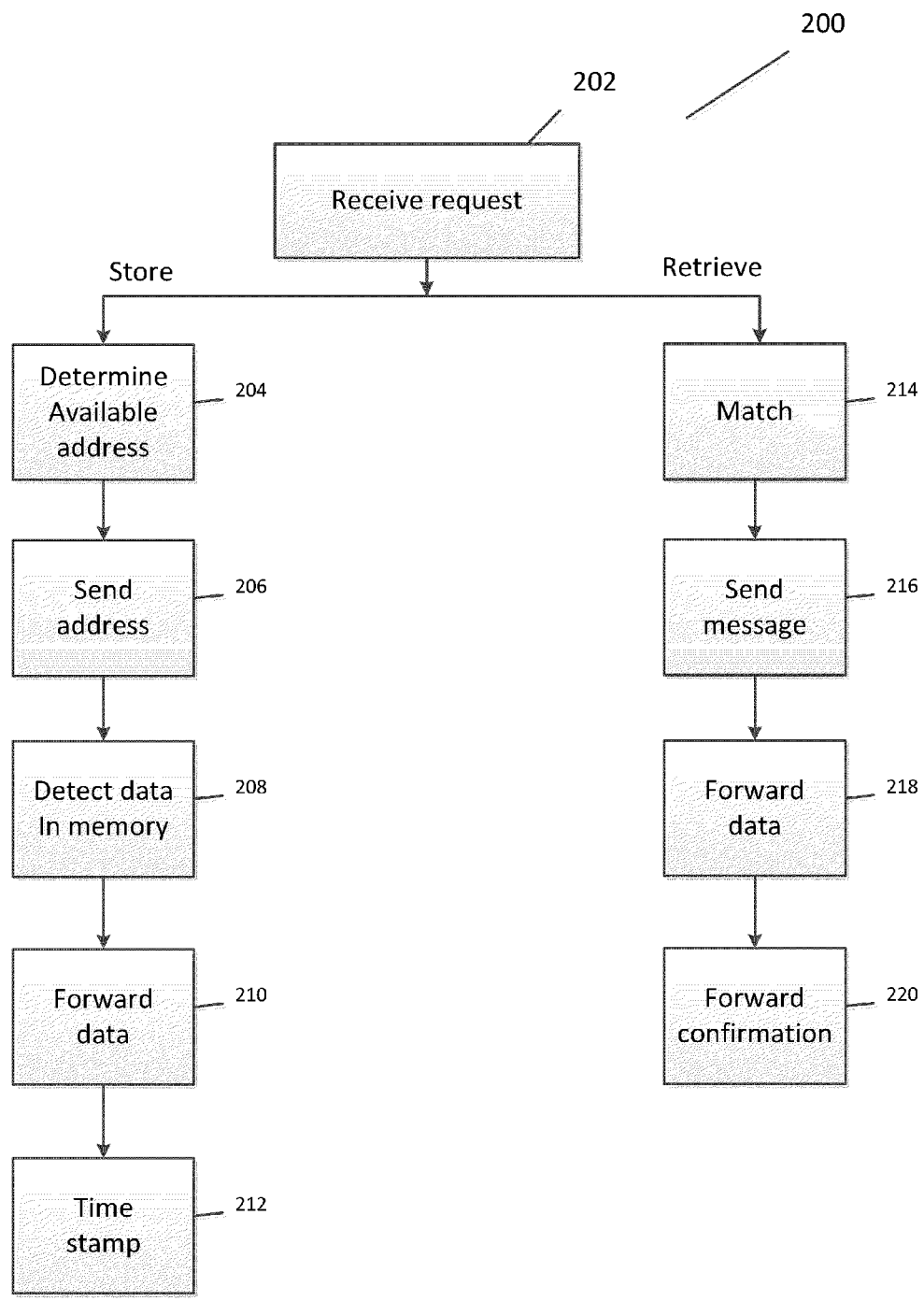
FIG. 5A is a flow diagram of an exemplary data forwarding process.
Figure 5B:
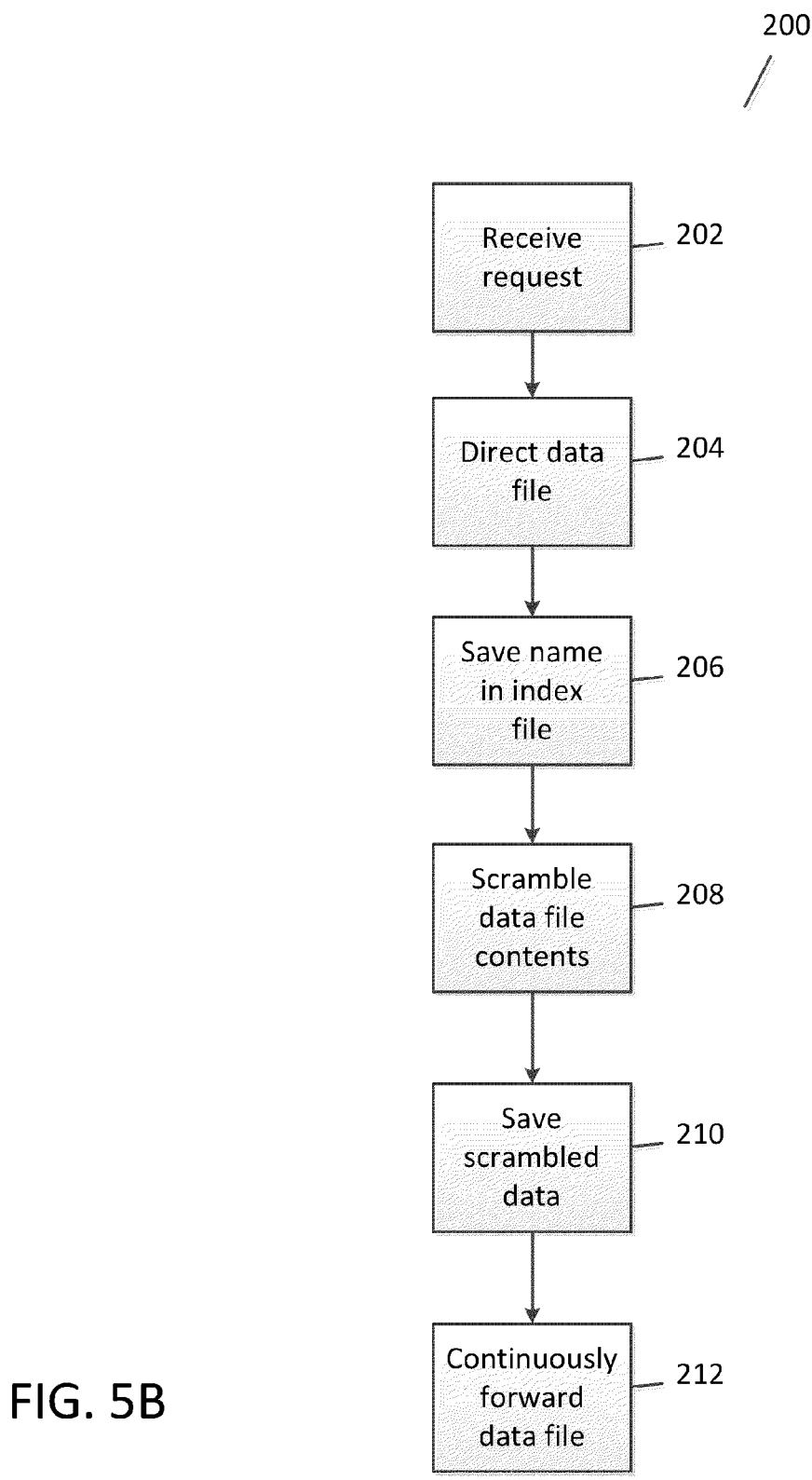
FIG. 5B is a flow diagram of another exemplary data file forwarding process.
Figure 5C:
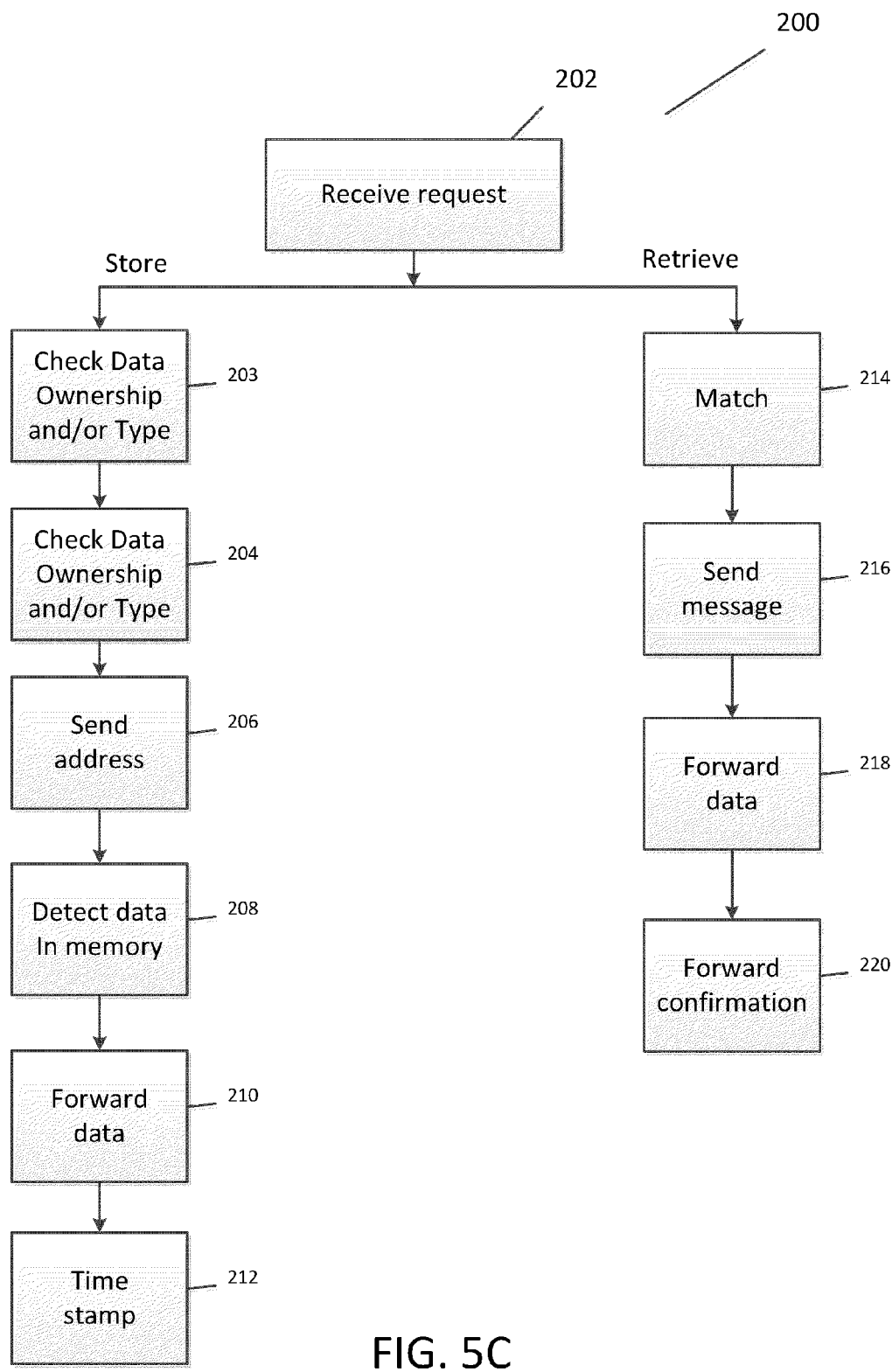
FIG. 5C is a flow diagram of another exemplary data file forwarding process.

FIGS. 5A, 5B, and 5C are flowcharts illustrating example processes of data forwarding. Any reference herein to process 200 may refer to process 200A of FIG. 5A, process 200B of FIG. 5B, and/or process 200C of FIG. 5C, depending on context of the reference.

As shown in FIG. 5A, data forwarding process 200 includes receiving (202) a request to store or retrieve data. If the received request is a request to store data, data forwarding process 200 determines (204) an address of a node available to receive the data in memory. This determination (204) can include pinging the network and determining which of the nodes in a network is available, or determining which node in the network has the least traffic, or determining which node in the network has the largest available memory, or any combination of these or other factors.

Process 200 sends (206) a message to the user system with the address of a specific node for the requester to forward the data.

Process 200 detects (208) the presence of data in node memory. Process 200 forwards (210) the data in memory to another node in the network of nodes and continues to repeat detecting (208) and forwarding (210) of the data from node memory to node memory. When data arrive in any node memory, process 200 affixes (212) a time stamp to the data. Additionally, as data enters and exits any mode memory, the data may be encrypted and de-encrypted.

Forwarding (210) can include pinging the node in the network to determine which of the nodes in the network is available, or determining which node in the network has the least traffic, or determining which node in the network has the largest available memory, or any combination of these or other factors.

In one specific example, at the point of entry to a node, data undergoes an encrypted "handshake" with the node or central server 14 or user. This can be a public or private encryption system, such as the Cashmere system, which can use public-private keys. Cashmere decouples the encrypted forwarding path and message payload, which improves the performance as the source only needs to perform a single public key encryption on each message that uses the destination's unique public key. This has the benefit that only the true destination node will be able to decrypt the message payload and not every node in the corresponding relay group. Cashmere provides the capability that the destination can send anonymous reply messages without knowing the source's identity. This is done in a similar way, where the source creates a reply path and encrypts it in a similar manner as the forwarding path.

In another example, other routing schemes are utilized.

If the received request is a request to retrieve data being continuously forwarded from node memory to node memory, data forwarding process 200 matches (214) at the central server 14 using a hash mark or other unique code that can be "sniffed" by the node upon the data entering the node via the encryption handshake. This can occur by pinging the nodes in the network. Process 200 sends (216) the message to return the data to the user directly to the node or node state where the central server 14 believes the data will likely appear. The more the central server 14 can narrow the node state that it pings to, then the more efficient the retrieval will become and the less burdened by unnecessary messaging traffic to nodes that are not necessary for a transaction between the central server 14 and the node capable of forwarding the data.

Once the correct node receives the message to forward the data in node memory to the requester, process 200 forwards (218) in node memory the data to the requester and forwards (220) a confirmation message that the data has been sent to the user. This routing message may be sent directly to the central server 14 or may be passed to the central server 14 or servers via other node(s) or supernode(s) in the network 10. Upon the user receiving the requested data the user's application functions to automatically ping the central server 14 that the data requested has been received. Thus the network 10 creates data storage without caching, downloading and/or storing the data on any physical storage medium. Data storage and management is accomplished via a continuous routing of the data from node memory to node memory, the forwarded data only downloaded when the user requests the data to be returned to the user from the network 10.

New nodes and node states may be added and/or deleted from the network 10 based upon performance. Users may have access to all nodes or may be segmented to certain nodes or "node states" by the central server(s) or via the specific architecture of the private, public or private-public network.

Individual nodes, nodes states and supernodes may also be extranet peers, wireless network peers, satellite peered nodes, Wi-Fi peered nodes, broadband networks, and so forth, in public or private networks. Peered nodes or users may be used as routing participants in the network 10 from any valid peer point with the same security systems employed, as well as custom solutions suitable for the rigors of specific deployments, such as wireless encryption schemes for wireless peers, and so forth.

In process 200, rather than have data cached or held in remote servers, hard drives or other fixed storage medium, the data are passed, routed, forwarded from node memory to node memory. The data are never downloaded until the authorized user calls for the data. A user on the system may authorize more than one user to have access to the data.

A primary goal in process 200 is to generate a data storage and management system where the data is never fixed in physical storage, but in fact, is continually being routed/forwarded from node memory to node memory in the network. The path of the nodes to which data is forwarded may also be altered by the central server 14 to adjust for system capacities and to eliminate redundant paths of data that may weaken the security of the network due to the increased probability of data path without this feature.

As shown in FIG. 5B, data file forwarding process 200B includes receiving (202) a request from a source system in a network to store a data file.

Process 200 directs (204) the data file to a computer memory in a network. Process 200 saves (206) a file name of the data file, and in some implementations, a file type, a username and a date stamp, in an index file associated with the central server 14; the actual data contained in the data file is not stored on any physical medium. The index file is used to search for data files during the search process 300, described fully below. Process 200 scrambles (208) a copy of the contents of the data file and saves (210) the copied scrambled data in memory or on a physical storage device associated with the central server 14.

For example, assume a data file named "myfile.txt" includes the following text: This is an example of data contained in an exemplary data file. The text herein is maintained as written in the data file and the data file continuously forwarded from node memory to node memory without storing on a physical medium.

Scrambling (208) a copy of the above data file may, in one example, results in the following scrambled data: to without storing on a physical medium example node this contained exemplary herein file from maintained text data, and the in continuously is an of forwarded memory.

Only this scrambled data, indexed by file name, is saved to physical storage—no unscrambled data file is stored in any physical medium, such as a disk drive. Saving the copied scrambled data aids in maintaining security and in searching for data files being continuously forwarded.

Process 200 continuously forwards (212) the data file from the first computer memory to other computer memories in the network without storing on any physical storage device in the network. Continuously forwarding (212) includes detecting a presence of the data file in memory of the specific node of the network and forwarding the data file to another computer memory of a node in the network of interconnected computer system nodes without storing any physical storage device.

In one specific example, at the point of entry to a node, forwarded data in the data file undergoes an encrypted "handshake" with the node or central server 14 or user. This can be a public or private encryption system, such as the Cashmere system, which can use public-private keys. Cashmere decouples the encrypted forwarding path and message payload, which improves the performance as the source only needs to perform a single public key encryption on each message that uses the destination's unique public key. This has the benefit that only the true destination node will be able to decrypt the message payload and not every node in the corresponding relay group. Cashmere provides the capability that the destination can send anonymous reply messages without knowing the source's identity. This is done in a similar way, where the source creates a reply path and encrypts it in a similar manner as the forwarding path. In another example, other routing schemes are utilized.

New nodes and node states may be added and/or deleted from the framework 10 based upon performance. Users may have access to all nodes or may be segmented to certain nodes or "node states" by the central server(s) or via the specific architecture of the private, public or private-public network.

Example Measurement in Data Forwarding and Storage

Data forwarded in the network can be measured. For example, the central server 14 maintains a store of data statistics each time new data is requested to be forwarded in the network. The store can be a flat file, a table, or a database file, and is continuously forwarded from node memory to node memory in the network with storage on any physical medium, such as a disk drive. Contents of the store record each time a file is requested to be forwarded, its owner, its type, and/or additional information. In this manner, the central server 14 can generate a list of useful information when requested. More particularly, the central server 14 can account for the number of files, the number of file types, and the gross amount of data (e.g., megabytes) in the system as a whole, or owned per user of group of users. The central server 14 tracks data added and removed from the network using the store. The central server 14 can generate a list of all data being forwarded in the network, and/or data being forwarded by a specific user or group of users.

Example Data Forwarding Assisted by Geolocation

Geolocation generally refers to identifying a real-world geographic location of an Internet connected computer, mobile device, website visitor or other. Geolocation can be used to refer to the practice of assessing the location, or it can be used to refer to the actual assessed location or location data. Geolocation can be performed by associating a geographic location with, for example, the Internet Protocol address, Media Access Control (MAC) address, Radio Frequency Identification (RFID), hardware embedded article/production number, embedded software number (such as UUID, Exif/IPTC/XMP or modern steganography), Wi-Fi connection location, or device GPS coordinates, or other, perhaps self-disclosed, information.

Networks in general, and more particularly the Internet, have become a collection of resources meant to appeal to a large general audience. Although this multitude of information has been a great boon, it also has diluted the importance of geographically localized information. Offering the ability for network users to garner information based on geographic location can decrease search times and increase visibility of local establishments. Similarly, user communities and chatrooms can be enhanced through knowing the locations (and therefore, local times, weather conditions and news events) of their members as they roam the globe. It is possible to provide user services in applications and Web sites without the need for users to carry GPS receivers or even to know where they themselves are.

Geolocation by IP address is the technique of determining a user's geographic latitude, longitude and, by inference, city, region and nation by comparing the user's public Internet IP address with known locations of other electronically neighboring servers and routers.

Possible applications for geolocation by IP address exist for Weblogs, chat programs, user communities, forums, distributed computing environments, security, urban mapping and network robustness.

Although several methods of geographically locating an individual currently exist, each system has cost and other detriments that make them technology prohibitive in computing environments. Global Positioning System (GPS) is limited by line-of-sight to the constellation of satellites in Earth's orbit, which severely limits locating systems in cities, due to high buildings, and indoors, due to complete overhead blockage. Several projects have been started to install sensors or to use broadcast television signals to provide for urban and indoor geolocation.

By contrast, these environments already are witnessing a growing trend of installing wireless access points (AP). Airports, cafes, offices and city neighborhoods all have begun installing wireless APs to provide Internet access to wireless devices. Using this available and symbiotic infrastructure, geolocation by IP address can be implemented immediately.

Several RFC proposals have been made by the Internet Engineering Task Force (IETF) that aim to provide geolocation resources and infrastructure. Several companies now offer pay-per-use services for determining location by IP. Several years ago, CAIDA, the Cooperative Association for Internet Data Analysis, began a geolocation by IP address effort called NetGeo. This system was a publicly accessible database of geographically located IP addresses. Through the use of many complex rules, the NetGeo database slowly filled and was corrected for the location of IP addresses.

To query the NetGeo database, an HTTP request is made with the query IP address, like this:

```
$ http://netgeo.caida.org/perl/netgeo.cgi?target-=192.168.0.1
VERSION=1.0
TARGET:192.168.0.1
NAME:IANA-CBLK1
CITY:MARINA DEL REY
STATE: CALIFORNIA
COUNTRY: US
LAT: 33.98
LONG: -118.45
LAT_LONG_GRAN: cITY
LAST-UPDATED: 16-MAY-2001
NIC: ARIN
LOOKUP_TYPE: Block Allocation
RATING:
DOMAIN_GUESS:iana.org
STATUS: OK
```

The NetGeo response includes the city, state, country, latitude and longitude of the IP address in question. Furthermore, the granularity (LAT_LONG_GRAN) also is estimated to give some idea about the accuracy of the location. This accuracy also can be deduced from the LAST_UPDATED field. Obviously, the older the update, the more likely it is that the location has changed. This is true especially for IP addresses assigned to residential customers, as companies holding these addresses are in constant flux.

Several existing packages assist in retrieving information from the NetGeo database. The PEAR system has a PHP package, and a PERL module, CAIDA::NetGeo::Client, is available. It is a relatively straightforward task to make a request in whatever language you are using for your application or service. For example, a function in PHP for getting and parsing the NetGeo response looks like this:

```
1: function getLocationCaidaNetGeo($ip)
2: {
3: $NetGeoURL = "http://netgeo.caida.org/perl/netgeo.cgi?target=".$ip;
4:
5: if($NetGeoFP = fopen($NetGeoURL,r))
6: {
7: ob_start( );
8:
9: fpassthru($NetGeoFP);
10: $NetGeoHTML = ob_get_contents( );
11: ob_end_clean( );
12:
13: fclose($NetGeoFP);
14: }
15: preg_match ("/LAT:(.*)/i", $NetGeoHTML, $temp) or die
("Could not find element LAT");
16: $location[0] = $temp[1];
17: preg_match ("/LONG:(.*)/i", $NetGeoHTML, $temp) or die
("Could not find element LONG");
18: $location[1] = $temp[1];
19:
20: return $location;
21: }
```

The NetGeo database slowly is becoming more inaccurate as IP address blocks change hands in company close-outs and absorptions. Several other tools are available for determining location, however. A description of the NetGeo infrastructure itself presents some of the methods it employed for mapping IP addresses and can be a source of guidance for future projects.

One of the most useful geolocation resources is DNS LOC information, but it is difficult to enforce across the Internet infrastructure. RFC 1876 is the standard that outlines "A Means for Expressing Location Information in the Domain Name System." Specifically, this is done by placing the location information of a server on the DNS registration page. Several popular servers have employed this standard but not enough to be directly useful as of yet.

To check the LOC DNS information of a server, you need to get the LOC type of the host:

```
$ host -t LOC yahoo.com
yahoo.com LOC 37 23 30.900 N 121 59 19.000 W 7.00m 100m 100m 2m
```

This parses out to 37 degrees 23' 30.900" North Latitude by 121 degrees 59' 19.000" West Longitude at 7 meters in altitude, with an approximate size of 100 meters at 100 meters horizontal precision and 2 meters vertical precision. There are several benefits to servers that offer their geographic location in this way. First, if you are connecting from a server that shows its DNS LOC information, determining your geolocation is simple, and applications may use this information without further work, although some verification may be useful. Second, if you are connecting on your second or third bounce through a server that has DNS LOC information, it may be possible to make an estimate of your location based on traffic and ping times. However, these estimates greatly degrade accuracy.

It also is possible to put the DNS LOC information for your Web site in its registration. If more servers come to use LOC information, geolocation accuracy will be much easier to attain.

The "host" is a DNS lookup utility that allows users to find out various pieces of information about a host. The simplest use is doing hostname to IP address lookups and the reverse. The reverse, dotted-decimal IPv4 notation, is used for this, and the actual server that hosts the canonical name is returned. The type flag, -t, can be used to obtain specific information from the host record from the name server.

Service providers typically provide an internal naming scheme for assigning IP addresses and associating names with these addresses. Typically, the canonical name of an IP address contains the country-code top-level domain (ccTLDs) in a suffix. CN is China, FR is France, RO is Romania and so on. Furthermore, the name even may contain the city or region in which the IP address is located. Often, however, this information is shortened to some name that requires a heuristic to determine. For example, in your service or application, a user may appear to be coming from d14-69-1-64.try.wideopenwest.com. A whois at this address reveals it is a WideOpenWest account from Michigan. Using some logic, it is possible to deduce that this user is connecting through a server located in Troy, Mich., hence the .try. in the canonical name.

Some projects have been started to decipher these addresses, and you also can get all of the country codes and associated cities and regions of a country from the IRNA Root-Zone Whois Information or the US Geospatial Intelligence Agency, which hosts the GEOnet Names Server (GNS). The GNS has freely available data files on almost all world countries, regions, states and cities, including their sizes, geographic locations and abbreviations, as well as other information.

Information such as that presented on the GNS also can be used to provide users with utilities and services specific to their geographical locations. For example, it is possible to determine a user's local currency, time zone and language. Time zone is especially useful for members of a community or chat group to determine when another friend may be available and on-line.

When a request to retrieve data is received by the central server 14 from storage process 100, the requested data, which is being forwarded from node memory to node memory in the network 10 assisted by geolocations of the nodes, is retrieved.

Data forwarded in this manner can be segmented and segments forwarded as described above. Still, the segmented data is not stored on any physical storage medium in any network node, but merely forwarded from the memory of one node to the memory of another node. As shown in FIG. 4A, storage process 100 includes sending (102) a request to a central server 14 to store or retrieve data. If the request is a retrieve data request, storage process 100 receives the requested data from the central server 14 or node in the network.

If the request to the central server 14 is a store data request, storage process 100 receives (104) an address of a node from the central server 14 and forwards (106) the data to the node memory represented by the received address. The central server 14 is assisted in finding an appropriate address by a geolocation, which can help locate a node that is underutilized or light in terms of network traffic.

As shown in FIG. 5C, data forwarding process 200C includes receiving (202) a request to store or retrieve data. If the received request is a request to store data, data forwarding process 200 determines (204) an address of a node available to receive the data in memory assisted by its geolocation. This determination (204) can include using a geolocation to help locate a node, pinging the network and determining which of the nodes in a network is available, or determining which node in the network has the least traffic, or determining which node in the network has the largest available memory, or the geographic coordinates of the node, or any combination of these or other factors. Using geolocation enables greater speed and efficiency by selecting nodes that are proximate to each other and/or the user.

Process 200 sends (206) a message to the user system with the address of a specific node for the requester to forward the data.

Process 200 detects (208) the presence of data in node memory. Process 200 forwards (210) the data in memory to another node in the network of nodes, assisted by geolocation (e.g., a location of the node in the network) and continues to repeat detecting (208) and forwarding (210) of the data from node memory to node memory assisted by geolocation. When data arrives in any node memory, process 200 affixes (212) a time stamp to the data.

Forwarding (210) can include pinging the node in the network to determine which of the nodes in the network is available, or determining which node in the network has the least traffic, or determining which node in the network has the largest available memory, or any combination of these or other factors.

Example Multi-Homed Data Forwarding and Storage

A node typically has one network interface with one associated network address. However, a node may include multiple network interfaces, each with their own associated non-loopback network address, such as a non-loopback Internet protocol (IP) address. Furthermore, a node may include a network interface with multiple associated non-loopback network addresses, such as multiple non-loopback IP addresses. Such a node is referred to as a "multi-homed node."

For example, the Internet Engineering Task Force (IETF) has developed IP version 6 (IPv6). The hierarchical layers provided by IPv6 may change the way multi-homing devices within a network are perceived. In IPv4, multi-homing is generally perceived as a host or system that uses multiple network interfaces. In contrast, hosts in IPv6 may only have one network interface, but respond to multiple global IPv6 addresses, link-local addresses, and site-local addresses. As a result, almost every host in the IPv6 network can be a multi-homed host.

Process 200 can be modified and enabled within a single computer system that includes multiple IP (IP) addresses (e.g., 2001:db8::1, 2001:db8::2 and 2001:db8::3 in IPv6), but only one physical upstream link. This is sometimes referred to as single link, multiple IP address (spaces) multi-homing.

As described above, a device can be multi-homed (e.g., host-centric multi-homing), when it has more than one interface, and each of the interfaces is attached to different networks (may be within a multi-homed network). In addition, in IPv6, each interface can have multiple addresses, which means than even with a single interface, a host can be multi-homed.

Multi-homing can provide a certain degree of resilience/redundancy against failures (link, hardware, protocols, others) and also enables features such as load balancing. Moreover, multi-homing can be used in order to differentiate traffic based on policy, for non-technical reasons, such as cost associated with different flows, time of the day, and so forth. For highly distributed enterprises, it can also occur as an aid to address that enterprise's geographical distribution, and as a traffic engineering mechanism to improve local performance such as latency and hop count reductions for real time protocols.

With single link, multiple IP address (spaces) multi-homing, a modified process 200 forwards data in memory within a single computer having multiple assigned IP addresses. When the computer is powered-off or experiences a failure, such as loss of power, all data being forwarded in memory is automatically forwarded to a node memory in the network 10, where it is continually routed/forwarded from node memory to node memory in the network 10 according to process 200. When power is restored to the computer, data is recovered/reloaded from the network 10 and then continuously forwarded within the memory of the computer without ever being fixed in physical storage.

Example Advertisement Forwarding

In one example, this data forwarding storage and management system where the data is continually being routed/forwarded from node memory to node memory in the network is used as an advertisement forwarding and retrieval system. Advertisement is deployed into the data forwarding storage and management system from a master server or control station and recalled on demand or in response to a stimulus or activity. Here, we consider advertisement as a broad term that can include any content, including, but limited to, text, audio, visual or any combination thereof. Advertisement can be deployed into the data forwarding storage network and recalled/retrieved when needed, e.g., directed to an IP address of a specific user system, directed to paid and/or unpaid subscribers of applications within the data forwarding storage network, and/or directed to users outside of the data forwarding storage network. Advertisement being continuously forwarded in the data forwarding storage network can be sent to all users or specifically targeted according to one or more user characteristics, user profiles, usage patterns, history and/or past or present viewed page content. The advertisement being continuously forwarded in the data forwarding storage network can be displayed to a current user within an application or web browser or delivered to a wired or wireless radio, television and/or television network. Advertisements can be retrieved in response to a stimulus or activity, such as the user's profile, traffic patterns of one or more users, application profiles, and so forth. Advertisements can be stored and delivered in any media form and either pre-configured by specific file type and size for a specific end user or site delivery requirements/formats, or delivered and formatted by virtue of the end user or middleware software compatibility systems.

In one example, selected advertisement can be delivered to a user through a web browser. More particularly, a plug-in and/or helper application can be associated with a user's web browser. In general, a plug-in is a computer program that interacts with a host application (a web browser or an email client, for example) to provide a certain, usually very specific, function "on demand." As a user navigates to a particular web page, the plug-in can parse displayed text. The plug-in can then request specific advertisement being continuously forwarded in the data forwarding storage network that matches the parsed text to the web browser of the user for display in a section of the display screen or as a pop-up.

In another example, a user requesting retrieval of a data file being continuously forwarded in the data forwarding storage network may be presented with specific advertisement being continuously forwarded in the data forwarding storage network that matches the user's profile. The user's profile may include various personal and/or demographic data that aids in directing appropriate advertisement to the user. The advertisement may then be displayed as a banner or in a shared window or in a separate window.

Figure 6A:
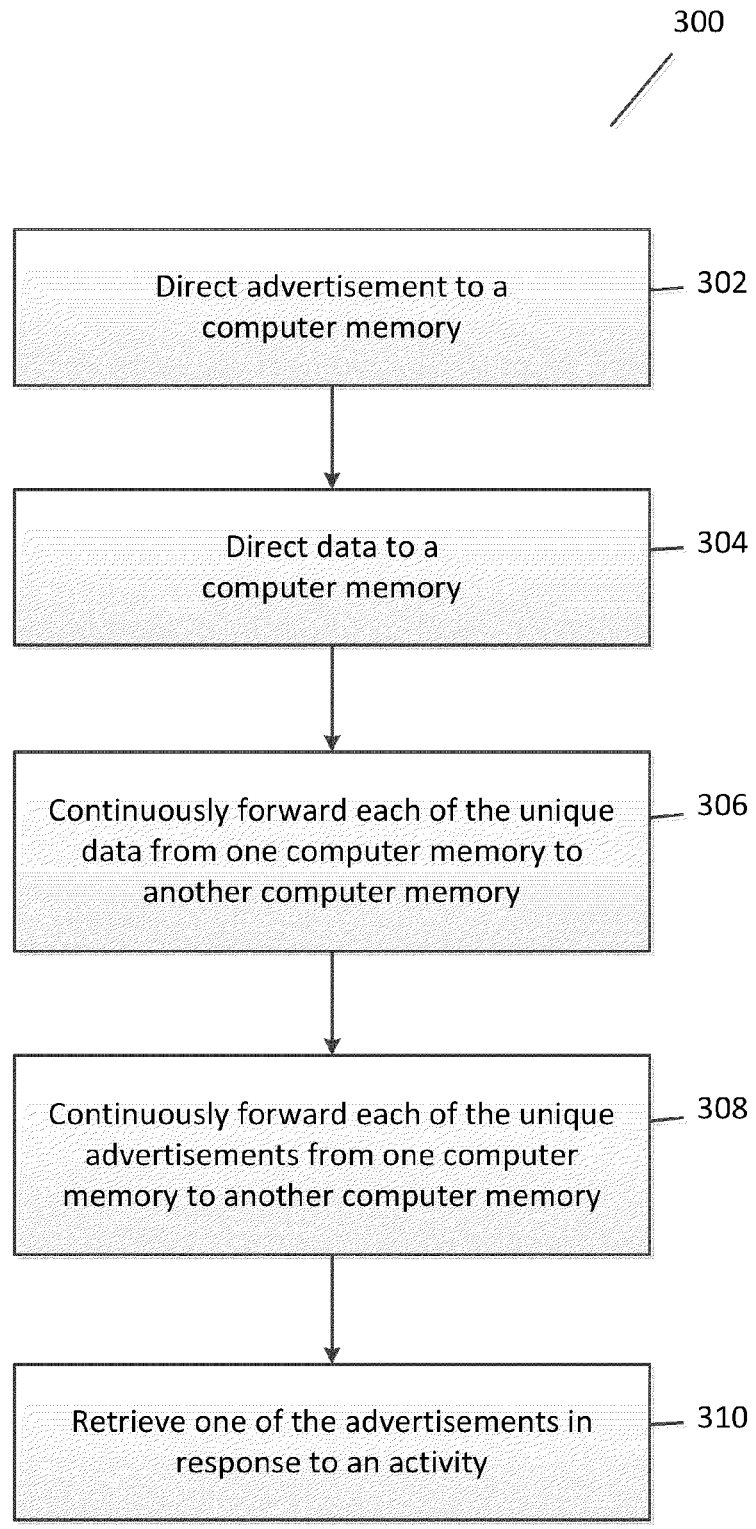
FIG. 6A is a flow diagram of an exemplary process for forwarding advertisements.

As shown in FIG. 6A, a process 300A includes directing (302) advertisement to a computer memory. The advertisement can include any content, including, but limited to, text, audio, visual or any combination thereof. The advertisement can include multiple configurations in order to satisfy different systems delivery specifications. Advertisements can be stored and delivered in any media form and either pre-configured by specific file type and size for a specific end user or site delivery requirements/formats, or delivered and formatted by virtue of the end user or middleware software compatibility systems.

Process 300 directs (304) data to a computer memory.

Process 300 continuously forwards (306) each of the unique data, independent of each other, from one computer memory to another computer memory in the network of interconnected computer system nodes without storing on any physical storage device in the network.

Process 300 continuously forwards (308) each of the unique advertisements, independent of each other, from one computer memory to another computer memory in the network of interconnected computer system nodes without storing on any physical storage device in the network.

Process 300 retrieves (310) one of the advertisements in response to an activity.

Example Data Retrieval

Figure 6B:
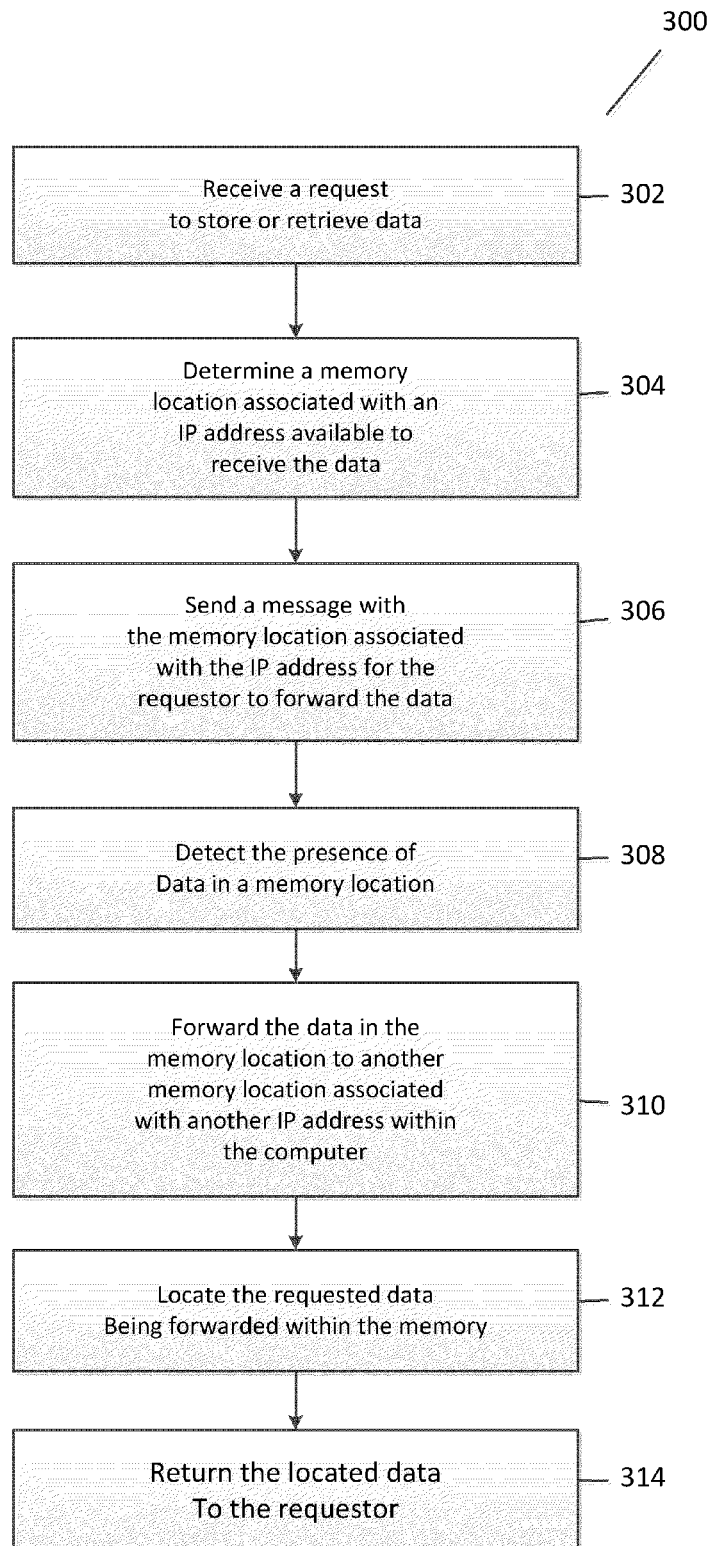
FIG. 6B is a flow diagram of an exemplary data forwarding process.
Figure 6C:
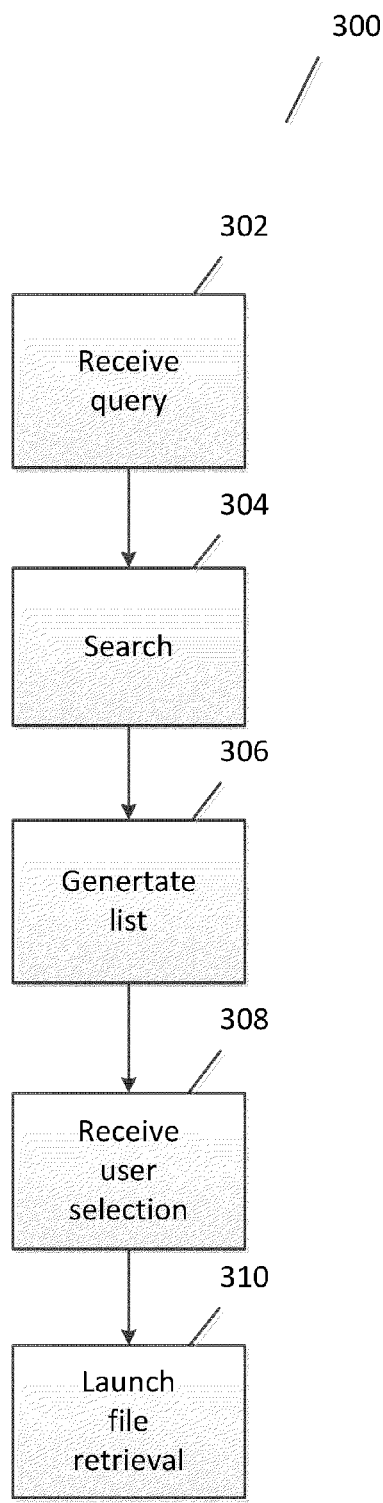
FIG. 6C is a flow diagram of an exemplary search process.

FIGS. 6A, 6B, and 6C are flowcharts illustrating example processes. Any reference herein to process 300 may refer to process 300A of FIG. 6A, process 300B of FIG. 6B, and/or process 400C of FIG. 6C, depending on context of the reference.

As shown in FIG. 6B, data forwarding process 300B includes receiving (302) a request to store or retrieve data. If the received request is a request to store data, data forwarding process 300 determines (304) a memory location associated with an IP address available to receive the data.

Process 300 sends (306) a message with the memory location associated with the IP address for the requester to forward the data.

Process 300 detects (308) the presence of data in a memory location. Process 300 forwards (310) the data in the memory location to another memory location associated with another IP address within the computer and continues to repeat detecting (308) and forwarding (310) of the data from memory location associated with one IP address to a memory location associated with another IP address.

If the received request is a request to retrieve data being continuously forwarded from memory location to memory location, data forwarding process 300 locates (312) the requested data being forwarded within the memory and returns (314) the located data to the requester.

Example Search Query Processing

As shown in FIG. 6C, the search process 300C includes receiving (302) a query. Example queries include filenames, file types, usernames, dates and so forth. In one example, the query is a keyword or keywords. Search process 300 searches (304) the database of scrambled files represented by the index of file names for a match of the keyword or keywords. If a match of the keyword or keywords is found among the scrambled files, process 300 generates (306) a list of filenames containing the keyword or keywords. In one example, the list of file names is displayed to a user on an input/output device, enabling the user to select one of the file names. In another example, the list of filenames displayed includes supplemental information with respect to the file, such as, file type, file size, date saved and/or last modified, and so forth. Process 300 receives (308) a user selection of one of the filenames contained in the generated list of file names. The user selection can include a mouse click, a key board input, an audio input, and so forth, indicating a selected filename.

Process 300 launches (310) a file retrieval process 400.

Example File Retrieval Process

Figure 7:
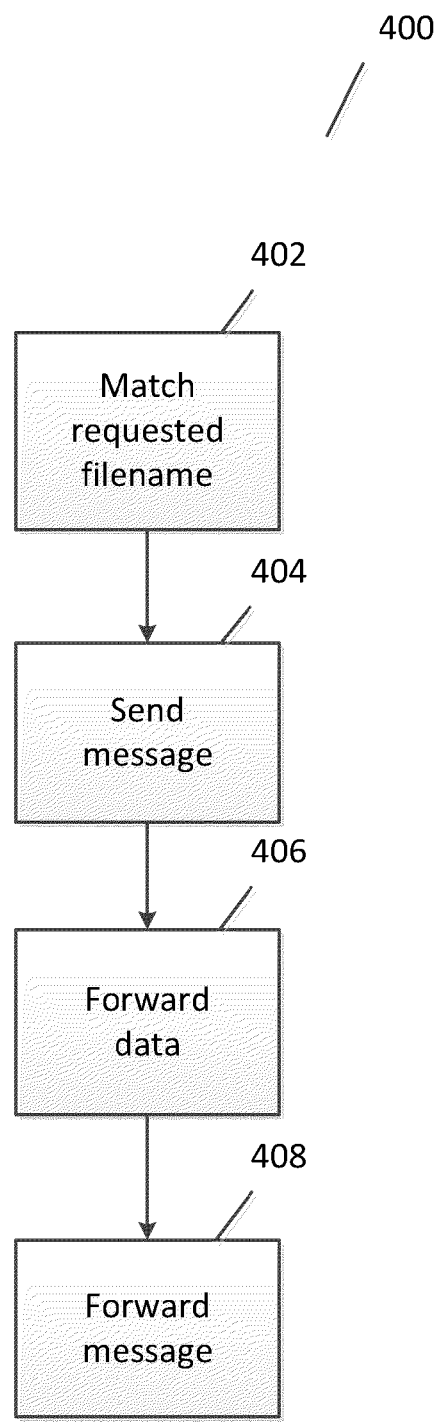
FIG. 7 is a flow diagram of an exemplary file retrieval process.

As shown in FIG. 7, the file retrieval process 400 matches (402) the requested filename at the central server using a hash mark or other unique code that can be "sniffed" by the node upon the data entering the node via the encryption handshake. This can occur by pinging the nodes in the network. Process 400 sends (404) the message to return the data to the user directly to the node or node state where the central server believes the data will likely appear. The more the central server can narrow the node state that it pings to, then the more efficient the retrieval will become and the less burdened by unnecessary messaging traffic to nodes that are not necessary for a transaction between the central server and the node capable of forwarding the data.

Once the correct node receives the message to forward the data in node memory to the requester, process 400 forwards (406) in node memory the data to the requester and forwards (408) a confirmation message that the data has been sent to the user. This routing message may be sent directly to the central server or may be passed to the central server or servers via other node(s) or supernode(s) in the framework 10. Upon the user receiving the requested data the user's application functions to automatically ping the central server that the data requested has been received. Thus the framework 10 creates data storage without caching, downloading and/or storing the data on any physical storage medium. Data storage and management is accomplished via a continuous routing of the data from node memory to node memory.

In another embodiment, storage process 100 only stores the scrambled data along with filename, and in some instances, file type, username, and/or date stamp, while automatically deleting the non-scrambled data file.

If the request to the central server 14 is a delete data file request, the central server 14 launches a file deletion process 500.

Example File Deletion

Figure 8:
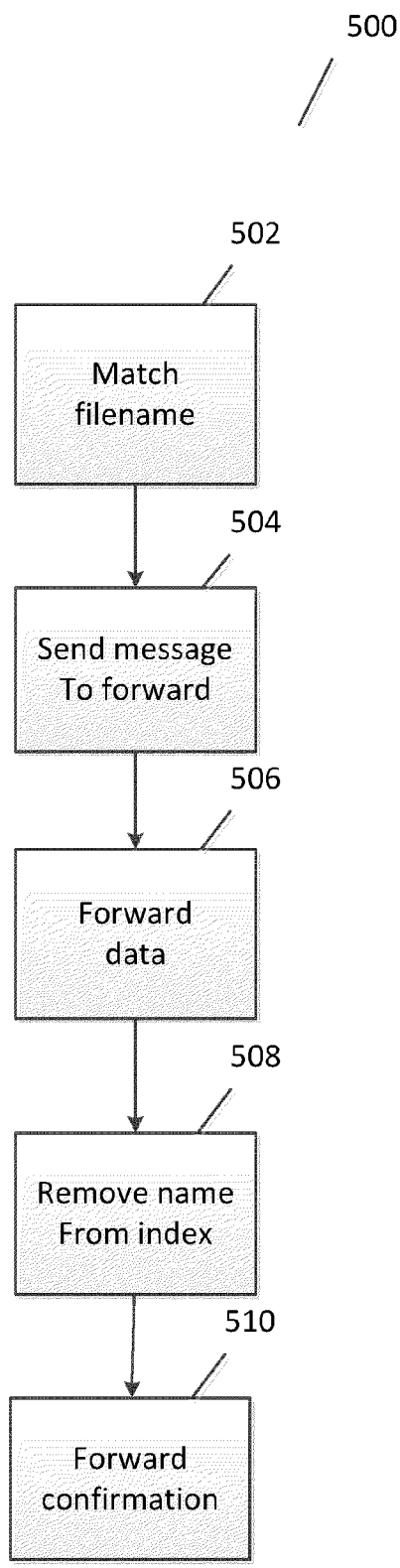
FIG. 8 is a flow diagram of an exemplary file deletion process.

As shown in FIG. 8, process 500 matches (502) the filename to delete at the central server 14 using a hash mark or other unique code that can be "sniffed" by the node upon the data entering the node via the encryption handshake. This can occur by pinging the nodes in the network. Process 500 sends (504) the message to forward the data to the deletion node 28 directly to the node or node state where the central server believes the data will likely appear. The more the central server can narrow the node state that it pings to, then the more efficient the retrieval will become and the less burdened by unnecessary messaging traffic to nodes that are not necessary for a transaction between the central server and the node capable of forwarding the data.

Process 500 forwards (506) in node memory the data to the deletion node. Process 500 removes (508) the data file name from the index and forwards (510) a confirmation message that the data has been deleted to the user. This routing message may be sent directly to the central server or may be passed to the central server or servers via other node(s) or supernode(s) in the framework 10.

The framework 10 creates data storage without caching, downloading and/or storing the data on any physical storage medium. Data storage and management is accomplished via a continuous routing of the data from node memory to node memory, the forwarded data only downloaded when the user requests the data to be returned to the user from the framework 10.

Example User Interface for Real-Time Communications

Figure 9:
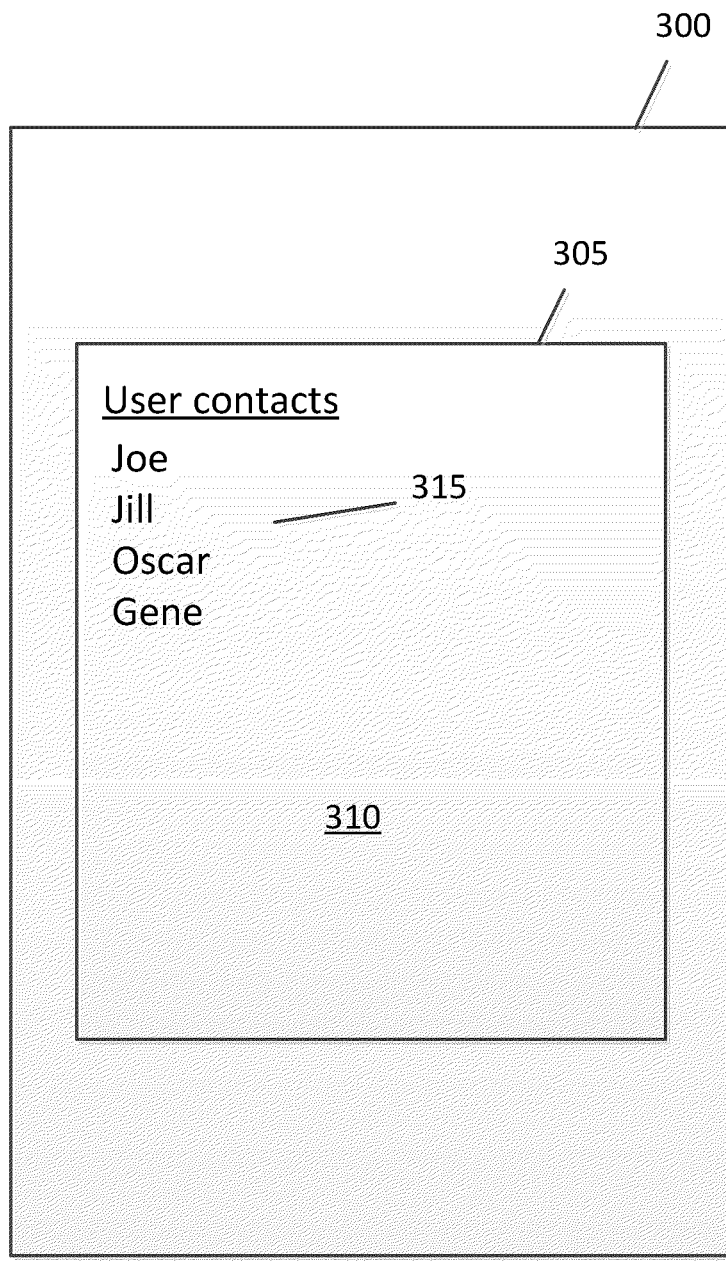
FIG. 9 is an example of a user interface for an instant messaging client program.

FIG. 9 illustrates an example interface presented to a user of one of the client systems 12, 14 when running an instant messaging client program. As described above, instant messaging programs typically enable users to communicate in real-time with each other in a variety of ways. For example, many instant messaging programs enable users to send text as an instant message, to transfer files, and to communicate by voice.

Shown is a desktop 900 with a user interface 905 of the instant messaging client program. User interface 905 has a text box 910 that displays representations 915 of the program user's contacts or buddies (both terms are used interchangeably herein), which are other users of an instant messaging program with whom the program user desires to communicate and interact. The representations 915 may provide contextual information to the program user about the buddy, such as whether the contact is online, how long the contact has been online, whether the contact is away, or whether the contact is using a mobile device.

The list of contacts displayed in text box 910 of user interface 905 typically is referred to as the contact list or buddy list. The IM program user can typically add or remove contacts from the contact list. In the example shown, the representations 915 are text icons showing the screen names of the contacts.

Instant messaging programs may use an instant messaging server to assist in communications between users of the instant messaging program. The instant messaging server may be implemented, for example, using central server 16. When a user is connected to the network and executes the instant messaging program, the instant messaging program contacts the central server 16 and logs the user onto the central server 16. The central server 16 informs the instant messaging program when the program user's contacts are online and facilitates communications between the program user and an online contact.

The central server 16 may support IM services irrespective of a program user's network or Internet access. Thus, central server 16 may enable users to send and receive IMs, regardless of whether they have access to any particular Internet service provider (ISP). The central server 16 also may support associated services, such as administrative matters, advertising, directory services, chat, and interest groups related to IM. To transfer data, the central server 16 employs one or more IM protocols. The data may be encrypted and de-encrypted.

To begin an IM session, the IM client program running on a client system 12, 14 establishes a connection with the central server 16 and logs onto the central server 16. Once a session is established, a user can use the IM client program to view whether particular buddies are online, exchange IMs with particular buddies, participate in group chat rooms, and trade files such as pictures, invitations or documents. The IM program user also may be able to find other buddies with similar interests, get customized information such as news and stock quotes, and search the World Wide Web.

Central server 16 may assist IM communications between users of IM client programs by facilitating the establishment of a peer-to-peer communication session between the IM client programs. Or the central server 16 may assist IM communications by directly routing communications between the IM client programs.

When a contact is online, the IM program user can communicate or interact with the contact in a number of ways. For instance, the IM program user can send an instant message to the contact (typically in the form of text).

Sending a message opens up a window in which messages can be typed back-and-forth between the IM program user and the contact. Similarly, the IM program user also can send a file or other content to the contact.

To initiate these actions for a contact, the IM program user performs operations on the representation of the contact displayed in user interface 905. The program then executes the corresponding action in response to the operation performed on the representation. For example, an instant message might be initiated by double-clicking on a contact's representation. Or, a file transfer might be initiated by the IM program user selecting the contact's representation to bring up a context menu and choosing "send a file" from the menu.

Other actions can be executed in response to operations performed on the representation of the contact displayed in interface 905. For instance, a "buddy icon" can be set for the contact such that communications with the contact display the buddy icon. In addition, for example, profile information about the contact can be retrieved, an alert can be set to inform the program user when the contact is online, a VoIP communication session can be established, or an e-mail can be sent.

User interface 905 may have icons 930 to help a user set various options or perform operations in the instant messaging program.

Example Rotating Encryption in Data Forwarding Storage

In one specific example, at the point of entry to a node, data undergoes an encrypted "handshake" with the node or central server 14 or user. The encryption scheme employed is under the control of the central server 14, which can change or rotate the scheme periodically or in response to external factors. Any two or more encryption schemes can be used. For example, encryption schemes involving simple conversions can include ASCII to Binary, Binary to ASCII, ASCII to Hex, Hex to ASCII, Binary to Hex, Hex to Binary, Dec to Hex, Hex to Dec, Dec to Roman, and Roman to Dec, and so forth.

Encryption schemes involving network tools can include IP to Dec, Dec to IP, IP to Hex, Hex to IP, IP/Net Calculator, IPv6 Validator, IPv6 Compress, IPv6 Uncompress, and so forth.

Non-Key En/DeCryption schemes can include Password-Gen, Backwards, Base 64 Encode, Base 64 Decode, Caesar Bruteforce, 133t 5p34k 3nc0d3, 133t 5p34k d3c0d3, Igpay Atinlay, Un-Pig Latin, ROT-13, and so forth.

HTML Encoding schemes can include HTML Entities Encode, HTML Entities Decode, URL Encode, URL Decode and so forth.

Hash Algorithm schemes can include DES, MD4, MD5, SHA1, SHA-224, SHA-256, SHA-384, SHA-512, HAVAL 128, HAVAL 160, HAVAL 192, HAVAL 224, HAVAL 256, RIPEMD 128, RIPEMD 160, RIPEMD 256, RIPEMD 320, Tiger, Tiger 128, Tiger 160, Adler 32, Whirlpool, GOST, CRC32, CRC32B, and so forth.

Key En/DeCryption schemes can include Tripple DES, Blowfish, CAST 128, CAST 256, GOST, Rijndael 128, Rijndael 192, Rijndael 256, SERPENT, Safer+, RC2, XTEA, LOKI97, DES, TwoFish, Wake (ECB mode, BASE64 armored), and so forth.

Time Conversion schemes can include Unix Timestamp to Date/Time, Date/Time to Unix Timestamp, Unix Timestamp to RFC 2822, Unix Timestamp to Internet Time, Unix Timestamp to ISO 8601, and so forth.

The central server 14 can direct a different encryption scheme to each of the network systems 16, 18, 20, 22, or a single encryption scheme to all of the network systems 16, 18, 20, 22.

The central server 14 can periodically direct one or more of the network systems 16, 18, 20, 22, to change their current encryption scheme to another encryption scheme. The central server 14 can direct the network systems 16, 18, 20, 22, to employ a particular encryption scheme based on the type of data being forwarded from node memory to node memory. The central server 14 can direct the network systems 16, 18, 20, 22, to employ a particular encryption scheme based on an owner of the data being forwarded from node memory to node memory.

The central server 14 can store the various encryption schemes locally and send a particular encryption scheme to a node memory for use, or the network systems 16, 18, 20, 22, can store the various encryption schemes locally and wait for instructions received from the central server 14 to select a particular encryption scheme for use.

If the received request is a request to retrieve data being continuously forwarded from node memory to node memory, data forwarding process 200 matches (214) at the central server 14 using a hash mark or other unique code that can be "sniffed" by the node upon the data entering the node via the encryption handshake. This can occur by pinging the nodes in the network. Process 200 sends (216) the message to return the data to the user directly to the node or node state where the central server 14 believes the data will likely appear. The more the central server 14 can narrow the node state that it pings to, then the more efficient the retrieval will become and the less burdened by unnecessary messaging traffic to nodes that are not necessary for a transaction between the central server 14 and the node capable of forwarding the data.

Redundant Data Forwarding

A redundant data storage and management system may be implemented where the redundant data is never fixed in physical storage, but in fact, is continually being routed/forwarded from node memory to node memory. The path of the nodes to which redundant data is forwarded may also be altered by the central server 14 to adjust for system capacities and to eliminate redundant paths of data that may weaken the security of the network due to the increased probability of data path without this feature.

The invention can be implemented to realize one or more of the following advantages. One or more networks create redundant data storage without caching or downloads. Redundant data storage and management are accomplished via a constant routing of the redundant data.

Other Descriptions

This data storage and management system in which the data is never fixed in physical storage, but in fact, is continually being routed/forwarded from node memory to node memory in the network, can be used as a backend system(s) in many applications that currently used fixed medium storage. In one example, this data storage and management system where the data is continually being routed/forwarded from node memory to node memory in the network is used in a media delivery system. Here, we consider media to broadly include any predictable content, any archival content, any audio content, visual content, any text-based content, and so forth. Predictable content can be deployed into the data forwarding storage network and recalled/retrieved when needed, e.g., directed to an IP address of a specific user system.

The content can include text, audio, visual images, audio-visual images, or any combination thereof. For example, the network can continuously forward certain audiovisual highlights that are used each day, such as program introductions, graphic packages, introduction and theme music, historical footage of significance, commonly used reference footage, and so forth.

This content being continuously forwarded in the network may or may not be needed in the future. More specifically, content that is most likely needed but are seeded into the network according to the probability of use, not based upon the individual needs of a user to store a file. In addition to using probability of need as a storage priority, the network can use a more diverse distribution list for the stored content than the forward storage system utilized by a user for "normal file storage" because users are delivered material not by calling/requesting a file from the network itself, but by virtue of a content provider using the network as a distribution tool to their audience.

One such example is a stock quote system. In traditional stock quote systems used on the World Wide Web ("Web"), a user accesses a stock quote website through a graphical user interface (GUI) used for web browsing, such as Firefox™, Opera™, or Flock™. One example stock quote website is Yahoo!™ Financial. The user enters a trading symbol of a stock in which he/she wants to query. The stock quote website receives the stock symbol, sends the stock symbol to a stock quote backend for a current price, receives the current price from the stock quote backend, and sends the current price to the user's GUI for viewing by the user. The current price is a numerical value, such as 171/2, in this example.

Numeric values can be deployed into the data storage and management system and continually routed/forwarded from node memory to node memory in the network. A range of numeric values in appropriate increments can be deployed in the data storage and management system, similar to how data files are deployed when a message to store is received. Each of the numeric values is sent from a user system to the central server 14 using the data forwarding process 200, fully described above. This results in a large number of distinct and unique numeric values continually being routed/forwarded from node memory to node memory in the network.

When a user requests a current stock price from a web application like Yahoo! financial, Yahoo! financial requests from the backend stock quote server a current price and the central server 14 is informed of this price directly from the back end stock quote server. The central server 14 requests the numeric value representing the received price from the network and once found, directs the numeric value to the Internet Protocol (IP) address of the user requesting the quote.

In another stock quote example, a range of numeric values embedded in text can be deployed into the data storage and management system where they are continually being routed/forwarded from node memory to node memory in the network. For example, "IBM is selling at 25," "IBM is selling at 251/8," and forth, can be deployed. When a result for the current price of IBM is received, the financial web site requests from the backend stock quote server a current price and the central server 14 is informed of this price directly from the back end stock quote server. The central server 14 requests the numeric value representing the received price, along with associated text, from the network and once found, directs the numeric value with associated text to the Internet Protocol (IP) address of the user requesting the price. For example, if the current price of IBM stock is 25, the central server 14 requests that "IBM is selling at 25" be delivered to the user requesting the quote.

The above specific example used a range of unique numeric values in appropriate increments deployed in our data storage and management system. However, any predictable content, archival data and/or media data can be deployed in our data storage and management system. For example, election results can be deployed into our data storage and management system. More specifically, a news item reporting "Senator Obama won the general election" and that "Senator McKane won the general election" can be deployed to the network where they are never fixed in physical storage, but in fact, continually being routed/forwarded from node memory to node memory in the network.

When the election results are known in November 2008, a user can request election results. The web application makes a request to a news service requesting election results from a web application having a back end supported by our data storage and management system. The central server 14 is informed of election results by a news server. The central server 14 locates the news item in the network and directs the news story to the Internet Protocol (IP) address of the user requesting the news information.

In each of the examples above, the network includes a group of interconnected computer system nodes each adapted to receive data items and continuously forward the data items from computer memory to computer memory, independent of each other, without storing on any physical storage device, in response to a request to store the data items from a requesting system and retrieve a particular data item being continuously forwarded from computer memory to computer memory in response to a request to retrieve the data item from the requesting system. Each node in the network is adapted to detect the presence of a data item in its memory and forward the data item to a computer memory of another node in the interconnected computer systems nodes according to a node's availability. The node's availability can be determined according to its volume of network traffic. Each node can encrypt the data item.

A central node can be adapted to match the data retrieval request at a central server using a hash mark representing the data item entering a node, send a message to a node that is predicted to have the data item in memory, the message instructing the node to forward the data item in memory to the requester, and send a confirmation message to the central server that the data item in memory has been forwarded to the requester.

The techniques described above are not limited to any particular hardware or software configuration. Rather, they may be implemented using hardware, software, or a combination of both. The programs may be implemented in a high-level programming language and may also be implemented in assembly or other lower level languages, if desired. Any such program will typically be stored on a computer-usable storage medium or device (e.g., CD-ROM, RAM, or magnetic disk). When read into the processor of the computer and executed, the instructions of the program cause the programmable computer to carry out the various operations described.

Furthermore, while the techniques have been described primarily with IM applications, they may be applied to other communications programs such as FTP programs, e-mail programs, voice-over-IP (VoIP) or other telephony programs, or players for streaming media.

It is to be understood that the foregoing description is intended to illustrate and not to limit the scope of the disclosure, which is defined by the scope of the appended claims. Other embodiments are within the scope of the following claims.

What is claimed is:

1. A method comprising:
without storing a data item on a fixed storage medium in a network of interconnected computer system nodes, the data item identified for constant routing within the network from node to node, the data item associated with a user account,
receiving, at a first node in the network, the data item;
receiving user account information based on the user account;
determining an address of a second node in the network available to receive the data item based on the user account information;
forwarding the data item to the second node in the network;
receiving a request to retrieve the data item being continuously forwarded in the network of interconnected computer system nodes; and
retrieving the data item from a node in response to the request to retrieve the data item, wherein retrieving the data item comprises:
matching the data item identified in the request at a central server using a unique code representing the data item entering a node;
sending a message to a node that is predicted to have the data item, the message instructing the node to forward the data item to a source system; and
sending a confirmation message to the central server that the data item has been forwarded to the source system.

2. The method of claim 1, further comprising periodically changing, via a central server in the network, an encryption scheme, wherein the data item is processed via the encryption scheme during the forwarding.

3. The method of claim 2, further comprising changing, via the central server, the encryption scheme in response to a type of the data item or an owner of the data item.

4. The method of claim 3, wherein the central server changes the encryption scheme based on the user account information.

5. The method of claim 4, wherein the central server changes the encryption scheme based on the second node.

6. The method of claim 2, wherein the encryption scheme is a simple conversion encryption scheme, network tools encryption scheme, non-key en/decryption scheme, Hyper-Text Markup Language (HTML) encoding scheme, hash algorithm scheme, key en/decryption scheme, or time conversion encryption scheme.

7. A device comprising:
a digital processor configured to, without storing a data item on a fixed storage medium in a network of interconnected computer system nodes, the data item identified for constant routing within the network from node to node, the data item associated with a user account:
receive, via a first node in the network, the data item;
receive user account information based on the user account;
determine an address of a second node in the network available to receive the data item based on the user account information;
forward the data item to the second node in the network;
receive a request to retrieve the data item being continuously forwarded in the network of interconnected computer system nodes; and
retrieve the data item from a node in response to the request to retrieve the data item by:
matching the data item identified in the request using a unique code representing the data item entering a node;
sending a message to a node that is predicted to have the data item, the message instructing the node to forward the data item to a source system; and
receiving a confirmation message that the data item has been forwarded to the source system from the node.

8. The device of claim 7, wherein the digital processor is further configured to identify an encryption scheme, wherein the data item is processed via the encryption scheme during the forwarding.

9. The device of claim 8, wherein the digital processor is further configured to change the encryption scheme in response to a type of the data item or an owner of the data item.

10. The device of claim 9, wherein the digital processor is further configured to change the encryption scheme based on the user account information.

11. The device of claim 10, wherein the digital processor is further configured to change the encryption scheme based on the second node.

12. The device of claim 8, wherein the encryption scheme is a simple conversion encryption scheme, network tools encryption scheme, non-key en/decryption scheme, Hyper- Text Markup Language (HTML) encoding scheme, hash algorithm scheme, key en/decryption scheme, or time conversion encryption scheme.

13. A network comprising:

a group of interconnected computer system nodes, each node configured to:

without storing a data item on a fixed storage medium in the group of interconnected computer system nodes, the data item identified for constant routing within the network from node to node, the data item associated with a user account, receive the data item;

receive user account information based on the user account;

determine an address of a second node in the network available to receive the data item based on the user account information; and forwarding the data item to the second node in the network; and a central server configured to:

match a data item retrieval request using a unique code representing the data item entering a node;

send a message to a node that is predicted to have the data item, the message instructing the node to forward the data item to a source system; and receive a confirmation message that the data item has been forwarded to the source system.

14. The network of claim 13, wherein forwarding the data item includes encrypting the data item according to an encryption scheme, the encryption scheme identified and periodically changed by a central server.

15. The network of claim 14, wherein the central server changes the encryption scheme based on the user account information.

* * * * *